(12) United States Patent
Richardson

(10) Patent No.: US 6,751,516 B1
(45) Date of Patent: Jun. 15, 2004

(54) METHOD AND SYSTEM FOR DIRECT WRITING, EDITING AND TRANSMITTING A THREE DIMENSIONAL PART AND IMAGING SYSTEMS THEREFOR

(75) Inventor: Timothy M. Richardson, Bolton (CA)

(73) Assignee: Richardson Technologies, Inc., Ontario (CA)

( * ) Notice: Subject to any disclaimer, the term of this patent is extended or adjusted under 35 U.S.C. 154(b) by 138 days.

(21) Appl. No.: 09/635,922

(22) Filed: Aug. 10, 2000

(51) Int. Cl.$^7$ .............................................. G06F 19/00
(52) U.S. Cl. ...................... 700/119; 700/118; 700/123; 700/166
(58) Field of Search ................................ 700/119, 118, 700/123, 166

(56) References Cited

U.S. PATENT DOCUMENTS

| | | | |
|---|---|---|---|
| 4,505,949 A | | 3/1985 | Jelks ........................... 427/38 |
| 5,093,149 A | * | 3/1992 | Doehler et al. ............. 136/258 |
| 5,460,758 A | * | 10/1995 | Langer et al. .............. 264/401 |
| 5,535,128 A | * | 7/1996 | Laube et al. ................ 427/596 |
| 5,612,887 A | * | 3/1997 | Laube et al. ................ 427/596 |
| 5,616,921 A | | 4/1997 | Talbot et al. ............... 250/307 |
| 5,659,479 A | * | 8/1997 | Duley et al. ................ 700/166 |
| 5,681,434 A | * | 10/1997 | Eastlund ..................... 204/156 |
| 5,989,397 A | * | 11/1999 | Laube et al. ................ 118/620 |
| 6,028,316 A | * | 2/2000 | Bender ..................... 250/492.1 |
| 6,046,426 A | * | 4/2000 | Jeantette et al. ....... 219/121.63 |
| 6,122,564 A | * | 9/2000 | Koch et al. ................. 700/123 |
| 6,459,951 B1 | * | 10/2002 | Griffith et al. ............. 700/166 |

FOREIGN PATENT DOCUMENTS

| | | |
|---|---|---|
| EP | 0 687 897 A1 | 6/1995 |
| JP | 62295213 1137547 | 11/1987 |
| WO | WO 92/16343 | 10/1992 |

OTHER PUBLICATIONS

XP–002104558 Laser–Induced Selective Deposition of Micron–Size Structures on Silicon Y.S. Liu, et al pp. 1441–1444.

XP–002104559 Wafer–Scale Laser Pantography: Fabrication of N–Metal–Oxide–Semiconductor Transistors and Small–Scale Integrated Citcuits, etc. Bruce McWillians, et al pp. 946–948.

\* cited by examiner

Primary Examiner—Leo Picard
Assistant Examiner—Alexander Kosowski
(74) Attorney, Agent, or Firm—Banner & Witcoff, Ltd.

(57) ABSTRACT

A method and apparatus for creating three dimensional solid forms in metals, ceramics, organics or any combination thereof is made possible using a computer controlled system to create local environmental conditions that favor deposition from a material stream, precursor gas, weld process or plasma. In order to increase control and accuracy, the material can also be placed while the target area is monitored by a broadband poly-spectral imaging system, which provides dimensional, geometrical, chemical composition, stress and temperature feedback to the computer controlling the process. The local environmental conditions in the deposition area are controlled for magnetic, electric, and acoustic fields as well as for temperature, pressure, flow dynamics, and atmospheric composition. Complex materials can be "written" to match a computer's file of a three dimensional shape with virtually any material composition, surface finish, and geometrical complexity. Discrete components, such as microspheres, optical, electronic or any other components or materials that do not lend themselves to the deposition process, can be inserted and the shape written around them to make them an integral part of the final form. While the system can "write" a three-dimensional shape it can also be used to "erase" some or all of a shape. The environmental conditions can also be changed so that material can be removed under computer controlled so that any corrections or final features can be created including such operations as final polishing or surface finishing. The digital files containing the three-dimensional image, environmental and compositional data can be sent to remote locations where the data can be used to write a new three dimensional object.

13 Claims, 10 Drawing Sheets

METHOD AND SYSTEM FOR DIRECT WRITING, EDITING AND TRANSMITTING A THREE DIMENSIONAL PART AND IMAGING SYSTEMS THEREFOR

FIELD OF THE INVENTION

The present invention relates to a method and apparatus for manufacturing an article by a deposition process. In particular, the present invention relates to a method and apparatus for manufacturing an article through a deposition process, and an imaging system for analyzing and controlling the process.

BACKGROUND OF THE INVENTION

Past patents have proposed many ways of depositing, or ablating, metals, liquids, gases, ceramics, glasses, organics, and combinations of these, using a number of different methods. In the past chemical vapor deposition, laser, ion, electron or other directed energy beam or plasma based deposition, and other deposition processes have be used to create thin films, particles for particular processes, semiconductor structures and other small components or bulk parts.

In the past a complete feedback system to control the parameters governing the characteristics of the deposition process has not been implemented. Laser and electric microwelding and deposition systems have been employed where the part or the welding system is scanned in one, two or three dimensions to create a final solid. These systems suffer for poor dimensional control, poor control of exact material characteristics and poor control of final surface finish. Even in thin film deposition and semiconductor processing integral multiparameter feedback has not been implemented to monitor and control the deposition process. One example of this is that thin film deposition processes are limited by stress buildup in deposited thin films when the film becomes too thick. Using the environmental control and feedback system it is possible to control the required number of parameters to create a three dimensional part with the required final characteristics. Simple parts with low tolerances will need a simple system for their creation. Complex parts with precise tolerances, complex alloys or material combinations, or fine surface finishes will require many more parameters to be controlled and more precise spatial control to be implemented.

SUMMARY OF THE INVENTION

It is an object of the present invention to provide a novel method and system for producing and modifying three dimensional objects which extends the capabilities of, or obviates or mitigates, at least one of the disadvantages of the prior art.

According to a first aspect of the present invention, there is provided a method of producing and/or editing a three dimensional part by employing a focused energy beam to form the part by the direct deposition of material onto said substrate while the part is being monitored by an optical imaging system which provides dimensional information which is used to control the deposition process. Preferably, the material to be deposited can be carried by said focused energy beam to the desired site for its deposition. Also preferably, the material to be deposited can be decomposed from a precursor gas at the desired site for deposition by said focused energy beam. Also preferably, the material to be deposited can be supplied in an energy beam and from blown in particles simultaneously. Also preferably, the material to be deposited can be supplied from a welding process and from blown in particles simultaneously. Also preferably, the material to be deposited can be supplied simultaneously, or from sequentially selected sources for defined periods of time in wide or local areas, from one or more of plasma sources, welding processes, blown in particles, inserted particles, or organometallic, metal halide, metal vapour or ceramic precursor gases.

According to another aspect of the present invention, there is provided a system for direct writing and/or editing of three dimensional parts, comprising: a deposition process for deposition of material onto a point on a three dimensional object where the deposition process can be any deposition process of which many are known to those skilled in the art; a control means to regulate the power level of and activate and deactivate the deposition process; a movable stage to receive a starting surface or point for said deposition process such that said deposition process deposits material on said starting surface or resulting three dimensional part when said deposition process is activated, where said substrate may be a starting surface such as a single starting point at the end of an armature or a conventional substrate surface; and stage control means to position said starting point or three dimensional part adjacent to said deposition process such that said material from said deposition process impinges at a desired site to form a three dimensional structure thereat; and optical, thermal, and/or X-ray imaging system to monitor the deposition process as it progresses and provide feedback to the deposition control means and the stage control means.

According to yet another aspect of the present invention, there is provided a system for direct writing and/or editing of information carriers, comprising: a focused energy beam; means to supply one or more selectable precursor gases to an area adjacent to a three dimensional part or starting point; a movable stage to receive said starting point and support the three dimensional part as it is produced such that said focused energy beam impinges on said precursor gas adjacent said starting point or three dimensional part and decomposes said precursor gas to deposit material therefrom onto said substrate; and stage control means to position said substrate relative to said focused energy beam such that said focused energy beam impinges at said desired site to form a three dimensional part thereat; and optical, thermal, and/or X-ray imaging system to monitor the deposition process as it progresses and provide feedback to the deposition control means and the stage control means.

According to yet another aspect of the present invention, there is provided a system for direct writing and/or editing of information carriers, comprising: a focused energy beam; means to supply one or more selectable precursor gases to an area adjacent to a three dimensional part or starting point; a movable stage to receive said starting point and support the three dimensional part as it is produced such that said focused energy beam impinges on said precursor gas adjacent said starting point or three dimensional part and decomposes said precursor gas to deposit material therefrom onto said substrate; and stage control means to position said substrate relative to said focused energy beam such that said focused energy beam impinges at said desired site to form a three dimensional part thereat; an optical, thermal, and/or X-ray imaging system to monitor the deposition process as it progresses and provide feedback to the deposition control means and the stage control means.

According to yet another aspect of the present invention, there is provided a method of producing and/or editing a master for a three dimensional part comprising the steps of: (i) providing a suitable three dimensional part on a positionable stage; (ii) directing a focused energy beam to a selected site on said three dimensional part; (iii) employing said directed focused energy beam to alter the surface of said three dimensional part at said site; (iv) moving said positionable stage such that said focused energy beam is directed to another selected site on said three dimensional part; (v) observing said three dimensional part with an imaging system which provides feedback information on the characteristics of the three dimensional part, which may include structural, geometrical, positional, crystallographic, spectral or chemical information provided by the imaging system, where such information is used to control the alteration of the surface; (vi) repeating steps (iii) and (v) to obtain a desired part.

According to yet another aspect of the present invention, there is provided a method of producing and/or editing a master for a three dimensional part comprising the steps of: (i) providing a suitable three dimensional part on a positionable stage; (ii) directing a focused energy beam to a selected site on said three dimensional part; (iii) employing said directed focused energy beam to remove the surface of said three dimensional part at said site; (iv) moving said positionable stage such that said focused energy beam is directed to another selected site on said three dimensional part; (v) observing said three dimensional part as it is being removed with an imaging system which stores information on the characteristics, which may include geometrical, positional, crystallographic, spectral or chemical information provided by the imaging system, of the three dimensional part where such information is used to recreate the three dimensional part at a later date; (vi) repeating steps (iii) and (v) to obtain the data file for a future part.

According to yet another aspect of the present invention, there is provided a method of producing and/or editing a three dimensional part comprising the steps of: (i) providing a suitable three dimensional part on a positionable stage; (ii) directing one or more deposition processes to a selected site on said three dimensional part; (iii) employing said deposition processes singly, simultaneously or in controlled sequence to alter the surface of said three dimensional part at said site; (iv) moving said positionable stage such that said focused energy beam is directed to another selected site on said three dimensional part; (v) observing said three dimensional part with an imaging system which provides feedback information on the characteristics of the three dimensional part, which may include structural, geometrical, positional, crystallographic, spectral or chemical information provided by the imaging system, where such information is used to control the alteration of the surface; (vi) repeating steps (iii) and (v) to obtain a desired part.

According to yet another aspect of the present invention, there is provided a method of producing and/or editing a three dimensional part comprising the steps of: (i) providing a suitable initial three dimensional part on a positionable stage; (ii) directing one or more deposition or ablation processes to a selected site on said three dimensional part; (iii) employing said directed deposition and ablation processes to alternately remove and alter the surface of said three dimensional part at said site; (iv) moving said positionable stage such that said deposition and ablation process is directed to another selected site on said three dimensional part; (v) observing said three dimensional part as it is being removed and altered with an imaging system which stores information on the characteristics, which may include geometrical, positional, crystallographic, spectral or chemical information provided by the imaging system, of the three dimensional part where such information is used to recreate the three dimensional part at a later date; (vi) repeating steps (iii) and (v) to obtain both the current part and a substantially similar future part.

According to yet another aspect of the present invention, there is provided a method of producing and/or editing a three dimensional object comprising the steps of: (i) providing a suitable starting point or initial three dimensional part on a positionable stage; (ii) directing one or more deposition or ablation processes to a selected site on said three dimensional part; (iii) employing said directed deposition and ablation processes to alternately remove, add to and/or alter the surface of said three dimensional part at said site; (iv) moving said positionable stage such that said deposition and ablation process is directed to another selected site on said three dimensional part; (v) adding a particle or particles or item of previous manufacture to a precise location on the three dimensional part so that they can be encapsulated or incorporated into the final three dimensional part in a later step; (vi) using the energy beam and/or energy fields and/or deposition or ablation processes in combination with or without externally introduced new materials to change the local conditions or chemistry of the part to cause selective and directed fusion, inclusions, glassification, alloying, tempering, annealing, sintering, surface finishing, machining, micro-machining or colloidal inclusions in the three dimensional part under the supervision of step (viii); (vii) optionally moving the three dimensional part in a controlled path to create gradients in the composition of the final part; (viii) observing said three dimensional part as it is being removed and altered with an imaging system with both macroscopic and microscopic capabilities which stores information on the characteristics, which may include geometrical, positional, crystallographic, spectral or chemical information provided by the imaging system, of the three dimensional part where such information is used to control all of the steps mentioned above to produce a final three dimensional part which conforms to a predefined set of criteria stored as a data file; (ix) repeating steps (iii) and (viii) to obtain both the current part and a substantially similar future part.

According to a further aspect of the present invention, there is provided a method and system of manufacturing a three-dimensional object where all or some of the part is created by the method or process under computer control. More specifically, the present invention relates to a method and system for writing and/or editing such parts by the direct deposition or removal of materials onto or from a part by ion beam; electron beam; molecular beam; laser induced deposition; laser fusion; arc deposition; plasma deposition; particulate or component part encapsulation, entrapment, implantation or entrainment; ablation, plasma discharge, carbonylation, gasification, sublimation, energetic oxidation or reaction. A computer file containing a three dimensional data set for the desired part is used as a starting point for the creation of the part. The chemical, optical, crystallographic, and spectral data for the part may also be stored in the image data file along with the related geometrical and structural data and used as part of the control system. An optical and/or spectral imaging system, which can include visible, ultraviolet, infrared, macroscopic and/or microscopic, and/or ion, electron or x-ray imaging systems with or without spectral analysis capability, is used to deliver images of the part which are acquired by a computer which can interpret the geometry, structure, chemical composition, and temperature of the final part as it is being written or edited. By using the data from the imaging and spectral systems the exact characteristic of the part can be adjusted on the fly to correct the part to the desired specification contained in the computer file While the part is being written or edited it is maintained in a controlled specific magnetic, electric, and/or acoustic field and the temperature, thermodynamics, pressure, gaseous content, particulate content, pressure (or vacuum), X, Y, Z, rotation and tilt are also controlled, all to control the characteristics of the final solid.

The method can be extended to include the erasure of a part under computer control and the methods described above where the computer collects all the available data on the part being erased in order to create the data file. This data file can then be used to recreate the part at a remote location.

The method and system can also be used to incorporate parts not made by this process by placing the parts to be incorporated at the appropriate locations as the part is being written into existence so that the incorporated parts become an integral element of the final solid.

In addition the method and system can be used to reheat areas of the part under precise control to cause annealing, tempering, case hardening, nitriding or other surface treatments as a stage of the process.

BRIEF DESCRIPTION OF THE DRAWINGS

Preferred embodiments of the present invention will now be described, by way of example only, with respect to the attached Figures, wherein.

DETAILED DESCRIPTION OF THE INVENTION

Figure 1:
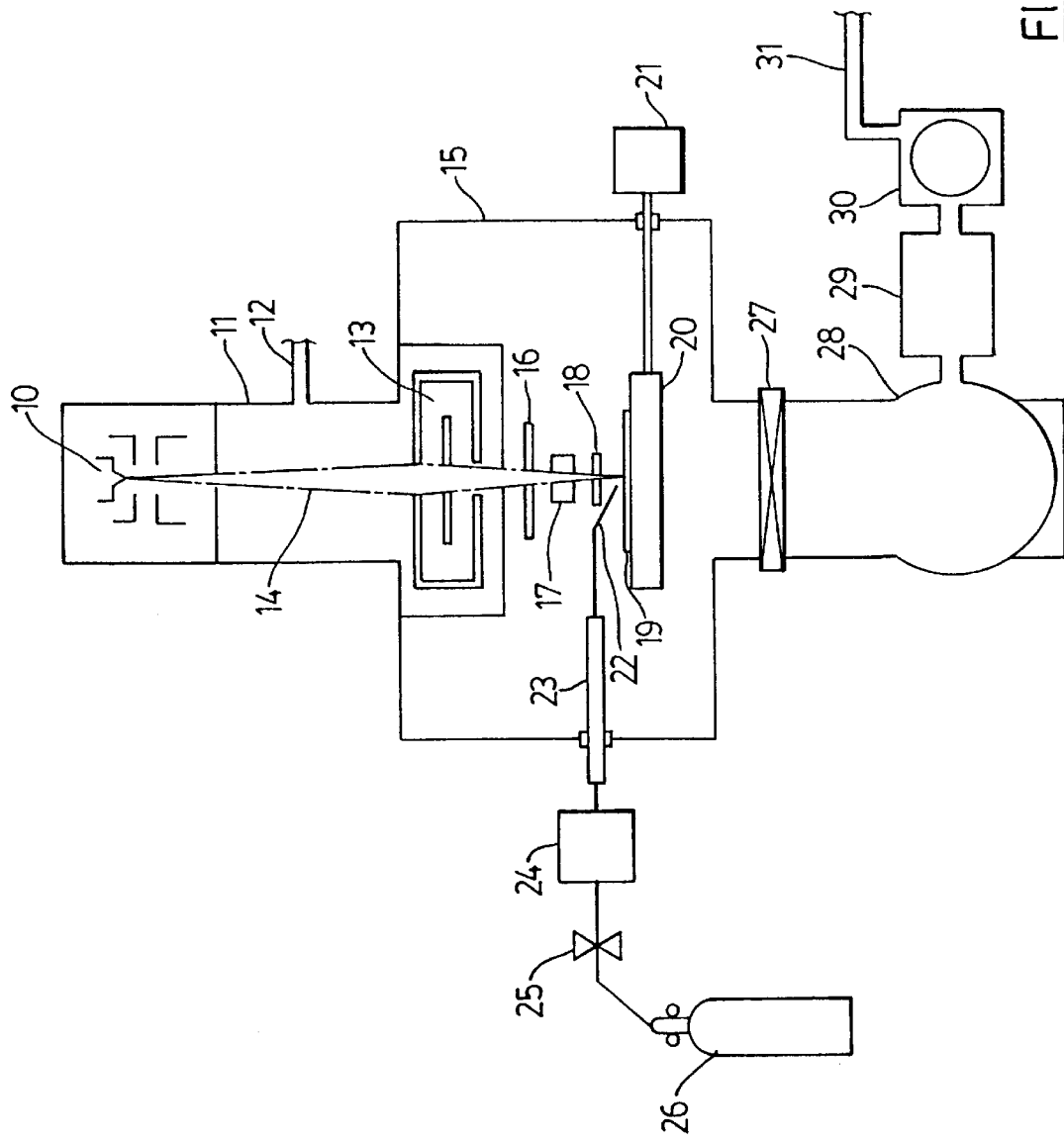
FIG. 1 shows a FOCUS manufacturing and/or editing system based on a typical energy beam technology in accordance with an embodiment of the present invention.

In the following description, "energy beam" is defined as including any source of directed energy including a light beam, a laser, an ion beam, a charged particle beam, an electron beam, a plasma beam, an X-ray beam, a maser beam, an radio frequency beam, or an acoustic beam; "energy field" is defined as including electric, magnetic, acoustic, or gravitational fields; "deposition" is defined as including any known deposition process including arc deposition, electron beam deposition, deposition from a precursor gas, plasma deposition, particle application and fusion, evaporative or chemical vapour deposition, ion assisted deposition, chemical reaction deposition, electroplating, ion implantation or particle entrapment in a solid or liquid matrix or solution; "ablation" is defined as consisting of any means of removing material such as laser ablation, thermal ablation, gasification, carbonylation, chemical reaction, energy beam machining, plasma discharge removal, or electrocleaning; "environment" is defined as consisting of the local temperature; thermal flow conditions; gas pressure; gas composition; gas flow dynamics; particulate composition and concentration in the atmosphere; vapor composition; liquid or solution; or energy field; at and surrounding the site of deposition, ablation, or energy beam impingement; "imaging system" is defined as an embodiment of an Advanced Real Time Integrated Microscope and Imaging Spectroscopy system, and which is referred to herein collectively as ARTIMIS in all its embodiments. The ARTIMIS system is more fully described in U.S. patent application Ser. No. 08/900,193, the contents of which are incorporated herein by reference. An ARTIMIS system can include any or all of a visible light imaging system, an ultraviolet light imaging system, an infrared light imaging system, a vacuum ultraviolet imaging system, a thermal imaging system, an X-ray imaging system, a single point spectroscopic analysis system, a linear array spectroscopic imaging system, an imaging spectroscopic system, an ion imaging system and/or an electron beam imaging system, with or without an integrated energy beam monitoring, focusing and delivery system and with or without zoom or discrete magnification changing capability for macroscopic and/or microscopic viewing.

The integration of the imaging system with a feedback and control system as a part of an overall part manufacturing or production system which includes deposition, or ablation technologies into one coordinated system is the subject of this application. The system in its various embodiments with any of the options described in this application is collectively called FOCUS for Flexible Optically Controlled Universal Synthesis.

The basic premise is that when FOCUS controls the environmental parameters, the deposition process, and the condition of the precursor materials to a sufficient degree, while observing the results and correcting the process to maintain the exact characteristics desired, then it is possible to create a system where virtually any material which occurs in nature, or can be imagined, can be created in any geometry under computer control.

In the past many types of materials have been deposited or manufactured using processes which lend themselves to the FOCUS system. Several of the processes are outlined below as indicative of the wide range of materials and technologies that can be controlled and optimised using FOCUS.

Conventional gas welding and burning techniques in which a mixture such as oxygen and acetylene or oxygen and hydrogen are burned at high temperature can be controlled by FOCUS to produce the desired characteristics on the final part.

Conventional electric arc welding processes involving atmospheric arcs, radio frequency arcs, inert or active gas shielded, submerged or multi-metal arcs can be controlled by FOCUS to produce the desired characteristics on the final part.

The present invention is concerned with the production of complex parts in a single system direct write process. The method of the present invention application is similar to methods developed for other manufacturing processes, except that the method of the present invention involves the deposition or ablation of a metal, ceramic, organic or inserted material with precise environment and energy field control under the direct control of an integrated optical and/or spectroscopic feedback system with the option to introduce particles or components which are placed and encapsulated with the deposited material. The resulting composites can then be treated with energy beams to allow alterations to their characteristics including alloying or controlled diffusion of the components to create such things as composite gradient structures. Areas of the part can be removed by ablation, under computer image control and spectroscopic chemical examination to produce a data file of the structure that was removed including chemical, geometrical and temperature data or to produce fine surface finishes or features.

Microfabrication and microdeposition processes can be used in FOCUS. Such processes which were used in the semiconductor and mask making industries in the past, have relied on focused ion beams, or focused molecular beams, to either directly deposit their ionic or molecular material on a suitable substrate, or to use focused ion beams or focused electron beams to cause selective localized deposition of the atoms or molecules of a suitable precursor gas. These precursor gases can be an organic gas such as Tetramethoxysilane as described by S. Lipp et al in, "Tetramethoxysilane as a precursor for focussed ion beam and electron beam assisted insulator deposition", J. Vac. Sci. Technol. B 4(6), November/December 1996, page 3920, for the direct deposition of silicon oxide/dioxide, and the contents of this publication are included herein by reference.

The precursor gas used in FOCUS can also be an organo-metallic gas such as Methylcyclopentadienyl trimethyl platinum (MeCp)PtMe$_3$ as described by Tao, Tao et al in, "Focused ion beam induced deposition of platinum", J. Vac. Sci. Technol. B 8(6), November/December 1990, page 1826, in which platinum structures were directly deposited from the precursor gas, and the contents of this publication are included herein by reference.

Gold, which can also be used in FOCUS, has also been deposited from a precursor gas as described by A. Wagner et al in, "X-ray mask repair with focused ion beams", J. Vac. Sci. Technol. B 8(6), November/December 1990, page 1557, and the contents of this publication are included herein by reference.

FOCUS can employ tungsten carbonyl W(CO)$_6$ has also been extensively used as a precursor gas by EICO Engineering of Co., Ltd., of Japan and other manufacturers in the USA. Alternatively, the material desired may be directly deposited by using appropriate substrates and ion sources along with post objective lens retarding as described by A. Keislich in, "Minimum feature sizes and ion beam profile for a focused ion beam system with post-objective lens retarding and acceleration mode", J. Vac. Sci. Technol. B12(6), November/December 1994, page 3518 and by Junichi Yanagisawa in "Low-energy focused ion beam system and direct deposition of Au and Si", J. Vac. Sci. Technol. B 13(6), November/December 1995, page 2621 in which gallium, gold, or silicon were directly deposited on a substrate, and the contents of these publications are included herein by reference.

FOCUS can employ nickel carbonyl has also been used as a precursor gas by several parties including International Nickel Company in U.S. Pat. Nos. 3,688,474, and 3,839,077 and by Mirotech Inc., in U.S. Pat. No. 5,470,651. The contents of these publications are included herein by reference.

Plasmas can serve as the source of at least one component of the material for FOCUS. Hitachi and others have used plasmas created for the deposition of materials such as those referred to in U.S. Pat. No. 3,916,034. In this patent externally generated plasmas are conducted to and focussed at a deposition surface by magnetic fields. The contents of this publication are included herein by reference.

Other metallic carbonyls have been explored and may be used in FOCUS. Xerox Corporation has used metallic carbonyls to prepare combinations or composites of ceramics/metallic or organic/metallics as referenced in U.S. Pat. Nos. 4,150,173, 4,238,588, and 4,245,026. The contents of these publications are included herein by reference.

The United State Department of Energy has developed and used many techniques which lend themselves to FOCUS. One method was used to produce microspheres and hollow microspheres in U.S. Pat. Nos. 4,257,799 and 4,336,338. The US DOE has also used plasma deposition to produce novel nickel, phosphorus, carbon alloys such as NiPC as described in their U.S. Pat. No. 4,626,448. The US DOE has also deposited amorphous metal alloys as described in their U.S. Pat. No. 4,929,468. The contents of these publications are included herein by reference.

Copper, silver and gold have been deposited using organo-metallic precursor gases and involve methods which are applicable to FOCUS and are described in International Business Machines U.S. Pat. No. 4,948,623. The contents of this publication are included herein by reference.

Superconductor insulation and the base superconductors themselves can be fabricated using deposition methods and-controlled alloying or reactions which can be precisely controlled using FOCUS. Examples of such a use include Westinghouse's U.S. Pat. No. 5,021,401. The contents of this publication are included herein by reference.

Exothermic or non-exothermic organometallic, or organometallic and gaseous reactions can also be used with FOCUS. Idemitsu Kosan Company Limited describes such reactions in their U.S. Pat. No. 5,207,878. The contents of this publication are included herein by reference.

Localized application of minute amounts of metals under computer control have been used for some time in the semiconductor industry for mask repair and trace metallizations. FOCUS makes possible the extension of these micro methods to large scale surfaces or to secure precise surface finishes. As example of such a method is shown in MCNC's U.S. Pat. No. 5,145,7114.

Ceramics can also be used as a precursor or component in this FOCUS. Such a method is described in Mitsubishi Denki Kabushiki Kaisha U.S. Pat. No. 4,816,293. The contents of this publication are included herein by reference.

Another example of material and methods which can be used with FOCUS are shown in patents relating to coatings for glass fibres and similar materials. Hughes Aircraft Company has used metal precursor gases consisting of metal carbonyls, metal halides, metal alkyls, metal aryls, metal olefins, metal esters, metal nitro compounds, metal hydrides and combinations and mixtures thereof to form metallic coatings in their U.S. Pat. No. 4,321,073. The contents of this publication are included herein by reference.

Volatile metal complexes have been widely investigated and can be used as the precursor gas for FOCUS. Corning Glass Works has investigated a number volatile metal complexes which are typical of the types of gases that hold potential as precursor gases in their U.S. Pat. No. 4,558,144 based on the work in U.S. Pat. Nos. 4,015,980, 4,424,352 and 4,425,281. The contents of these publications are included herein by reference.

Materials have been co-applied in metal composites such as those referred to in U.S. Pat. No. 4,250,832. FOCUS can control and enhance these methods and produce new materials based on these methods. In this patent a metal carbonyl is decomposed while a radioactive gas is ionized, accelerated and implanted or entrapped in the resulting solid material. The contents of this publication are included herein by reference.

Electric arc deposition methods can also serve as a basis for FOCUS. Such methods and apparatus are described in Multi-Arc Vacuum Systems, U.S. Pat. No. 4,620,913. The contents of this publication are included herein by reference.

Exotic materials such as diamond films or graded diamond based composites or alloys can be created alone or as a coating on a part by using FOCUS. The deposition process is described in U.S. Pat. No. 5,236,545. Diamond waveguides can be created by FOCUS using the methods outlined in U.S. Pat. No. 5,629,532. The contents of these publications are included herein by reference.

A two beam approach where the two beams can be two laser beams, a laser beam and an ion beam, an ion beam and an electron beam or any combination of energy beams, can be used with FOCUS to deposit material. Such an example of a two laser approach is described in U.S. Pat. No. 5,441,569. The contents of this publication are included herein by reference.

Electron beams can be used to generate a vapor for deposition using FOCUS. Such an example of electron beam vapor generation is shown in U.S. Pat. No. 5,534,314. The contents of which are included herein by reference.

Plasma plumes and local plasma regions can be created, contained and directed by various methods in order to deposit material using FOCUS. A method of manipulating plasmas in such a way is described in U.S. Pat. No. 5,578,350. A second approach to manipulated plasma plumes is contained in U.S. Pat. No. 5,672,211. The contents of these publications are included herein by reference.

Ultrapure, or composite crystals with unusual compositions, striations, layers or local regions, can be grown or layered using FOCUS. The basis for such an approach is outlined in U.S. Pat. No. 5,705,224. The contents of this publication are included herein by reference.

Using the FOCUS system a composite matrix of different materials can be laid down by a process of impinging materials onto the three dimensional part and then raising the temperature of the part by the action of an energy beam, or alternately impinging the material unto the surface under the action of the energy beam, while controlling the environment and watching the resulting composition with ARTIMIS. Ultraflat surface finishes can be achieved by controlling the acoustic field as the part solidifies or by using ablation methods or by controlled deposition where in all cases ARTIMIS is used to control the geometry and composition. Once the desired composition and geometry are achieved then the part can be cooled under the supervision of ARTIMIS in order to achieve the correct degree of annealing or material diffusion. Post processing to created features can be accomplished by the energy beam machining or ablation again under the direct control of ARTIMIS.

The FOCUS system lends itself to a new method for welding difficult materials such as copper or aluminum. The environment is controlled to keep the part or parts to be welded at a temperature to minimize the oxidation of the parts to be welded and the environment is further controlled to minimize the presence of reactive species adjacent to the weld area. The temperature conditions and the degree of oxidation is monitored by ARTIMIS which in turn controls the FOCUS system. An energy beam raises the temperature locally to the welding temperature and a deposition process which would typically be an electric arc welding process or a particulate delivery system is used to introduce the welding material into the region to be welded. At the same time the weld geometry, the temperature gradient around the weld and the local preheat in both parts is monitored by ARTIMIS to ensure the correct parameters for optimum weld characteristics and the part is positioned by FOCUS to control the geometry of the final welded area. The welded part is then cooled and annealed under the supervision of ARTIMIS.

Using the FOCUS system it is possible to make complex structures by a process involving the decomposition of a precursor gas which exhibits low temperature decomposition such as nickel carbonyl, in contact with a suitable low temperature material such as an organic compound. Once the low temperature material is placed in the correct geometry and locked into place by the metal from the decomposition process and the metal provides a conduction path for heat away from the organic then a second or multiple deposition process can be used to apply progressively thicker layers of materials requiring high temperatures for their fusion to the part, or successively higher temperatures materials to the part under the control of ARTIMIS so the temperature gradient between the higher temperature zones and the incorporated low temperature material is maintained at levels so that the low temperature material is not damaged. Alternately a low temperature, low pressure, chemical vapor deposition can be used to establish the thermally conductive layers on the low temperature part. Then the process described above can be used to add the higher temperature areas of the part.

A CD direct write process is described in PCT Application No. PCT/CA98/00844, the contents of which are incorporated herein by reference.

The Sandia LENS (trademark) manufacturing process reported in Sandia news release dated Dec. 4th, 1997, is a laser induced deposition process under computer control. The contents of this publication are included herein by reference. The Sandia process can benefit from FOCUS in that the feedback and control will allow high and low temperature materials to be alloyed in complex alloys with precise control of the material composition and changes of the material in gradients in local areas. At the same time the feedback data from FOCUS will permit precise geometric shapes and complex finishes to be created with complete repeatability. Also the concept of inserted, ion or e-beam implanted, entrained and entrapped particles or components, described herein, will greatly increase the flexibility of the Sandia system. This increase in capability of the Sandia process is especially true where the decomposition of precursor gases at low temperatures is used to entrap or surround a temperature sensitive material. Once the low temperature material is encased with the material decomposed from the precursor gas and consequently temperatures can be controlled locally, then FOCUS can slowly add progressively higher temperature materials until the outside layers can be coated in high temperature compounds such as ceramics and refractory material. The encapsulation is accomplished by localized reheating, and the addition of new material with the Sandia process while FOCUS provides the precise computer control to allow the temperatures, material compositions, and geometries to be controlled to prevent damage to the sensitive inner components.

The principle differences between the subject matter of the prior art, as evidenced by publications referred to above, and the present invention is that, instead of performing an open loop operation such as the spot repair of a semiconductor, in the present invention a single point, previous part or substrate starting point is monitored by an imaging system, ARTIMIS, and the focused energy beam or the substrate or the deposition process or the ablation process, or any or all, are scanned in several coordinates, preferably in a five axis fashion, to create, edit, or collect information concerning a desired three dimensional part.

A first embodiment of the present invention, FOCUS, employs a focused energy beam system, in this example a focused ion beam or "FIB", as shown in FIG. 1. In FIG. 1, a source of ions 10, typically a liquid metal source such as a gallium source, supplies a beam of ions 14. Source 10 is held at a relatively high voltage in order to accelerate the ions towards a target substrate 19 which is typically maintained at ground potential. An ion generating chamber 11 is exhausted through a port 12 to an external pump system. Ion beam 14 is focused by an objective lens 13 to a beam of variable diameter.

Typically, the diameter of beam 14 is selected to optimize the deposition rate and the required final part geometry. The selection of such a diameter will depend upon the actual focused energy beam system selected, the precursor gas (if any) employed and other factors and is within the normal skill of one of skill in the art.

Beam 14 passes from ion generating chamber 11 into a sealed evacuated three-dimensional part fabrication chamber 15. A beam deflector 16 can be employed to scan beam 14 about three-dimensional part 19, for the purposes of imaging the three-dimensional part, by employing a detector and computer imaging system (not shown) which can be helpful in verifying the deposition data and correcting or editing the deposition, if required. If the system is only to be used for direct writing of three-dimensional parts, and no imaging is required, then beam deflector 16 can be omitted from the system.

A modulation or shutter system 17 can be used to modulate beam 14 if required, although it is contemplated that this would normally be accomplished by controlling the parameters of beam 14 at source 10. Beam 14 can be retarded or decelerated by a retarding system 18 which applies a retarding voltage to beam 14 in order to reduce the ion energy just prior to impact at substrate 19.

If retarding system 18 is employed, then beam 14 can directly deposit the material onto three-dimensional part 19 from the ion source 10 via the beam of ions 14, and no precursor gas is required. In this case, source 10 can be any suitable metal, ceramic, alloy or ionizable material such as silicon, or gold.

In either case, beam 14 is focussed on three-dimensional part 19, which is mounted on a system stage 20, whose movement is controlled by a dual, triple, quadruple or five axis drive 21 which is internal or external to sealed fabrication chamber 15. Preferably, as the deposition process should be as flexible as possible at least a three axis drive should be employed and preferably a five axis drive.

If retarding system 18 is not employed, a suitable precursor gas is delivered locally to the point of impact of ion beam 14 on three-dimensional part 19 by a nozzle 22. The ions in beam 14 cause the precursor gas to decompose resulting in the deposition of material onto three-dimensional part 19 at the point of impact of beam 14. Nozzle 22 must be environmentally controlled by an environmental control tube 23 to ensure that nozzle 22 delivers the precursor gas in the appropriate condition to give the best deposition yield. Environmental control tube 23 permits the control of appropriate process parameters such as temperature, velocity, pressure and charge of the gas. Typically, nozzle 22 must also be heated to a point approaching, but not equalling, the decomposition temperature of the precursor gas so that a minimum of external energy is required to cause decomposition at the interface between the gas and three-dimensional part 19. The precursor gas can be generated in a gas generator 24, which in the case of nickel carbonyl consists of finely divided nickel powder heated to a suitable temperature and over which is passed a stream of carbon monoxide.

The gas required for the gas generation, or the precursor gas itself in cases where the precursor gas can be obtained in a prepackaged form, is supplied from gas storage cylinder 26 via control valve 25. Depending on the deposition or ablation process chosen it may be preferable to maintain the fabrication chamber above or below atmospheric pressure and/or fill the fabrication chamber with protective or reactive atmospheres. If the fabrication chamber is held in a vacuum or pressure then such conditions can be established and maintained by a vacuum or pressure pump 28 which can be isolated from the fabrication chamber via a main isolating valve 27. A load lock (not shown) can be used to transfer the three-dimensional part 19 in and out of fabrication chamber 15 without loss of internal environmental conditions. As will be apparent to those of skill in the art, the load lock should be protected with suitable exhaust so that toxic gases are not allowed to leave the fabrication chamber 15 via the load lock.

The gases leaving main pump 28 must be scrubbed or otherwise treated to remove the gas components from the precursor gas. In the case of nickel carbonyl, a suitably heated tube can be used to deposit the metallic nickel onto the tube walls leaving the carbon monoxide. Further information on the nickel carbonyl process will be apparent to those of skill in the art and can be found by consulting the MOND nickel process in appropriate metallurgical handbooks, such as "The Winning of Nickel", Joseph R. Boldt, Jr. et al., 1967 Longmans Canada Ltd, page 374, the contents of which are incorporated herein by reference. Clean gas is then passed to an exhaust pump 30 and an external exhaust line 31.

In this embodiment, the focused ion beam delivers a high current beam of ions of a suitable material, such as gallium, to a suitable three-dimensional part which has been pre-prepared or created from a point source or on a substrate, through a focusing system and in the presence of a suitable precursor gas, such as nickel carbonyl $Ni(CO)_4$ or tungsten carbonyl, which are delivered locally to the surface of the three-dimensional part at the point of ion beam impact. As is apparent to those of skill in the art, nickel carbonyl is an extremely toxic gas and must be handled with extreme care.

The ion current of the FIB system is set to give the required deposition conditions including deposition rate, depending on beam diameter, and the FIB "on" pulse time is set to produce the desired deposition rate per pulse. The precursor gas supply rate is set to give the required supply of atoms per unit time in the deposition area. The three-dimensional part is then stepped according to a computer file stored in the controlling computer system in up to five axes of motion under the stationary focused ion beam which is modulated and adjusted as to beam diameter to produce the deposition in the desired geometric arrangement to provide the desired finished three-dimensional part. During the deposition process the FIB system is also either continuously or occasionally used in imaging mode to check the geometry of the achieved deposition at which point changes in the deposition geometry can be made by adding more material or editing existing material to accomplish the desired final three-dimensional part When it is desired to edit an existing three-dimensional part to add or remove features or to perfect details or surface finish, the focused energy beam can be used to identify existing structures on the three-dimensional part or to locate sites to be edited. These sites then can either have material deposited or ablated to obtain the desired geometry. Multiple layers of various materials can be deposited by selecting from among a variety of precursor gases or by mixing or reacting precursor gases during the deposition process. New features can also be added to an existing three-dimensional part of previous manufacture, after the appropriate sites have been identified using the imaging capability of the system, by depositing or ablating/micromachining material.

Figure 2:
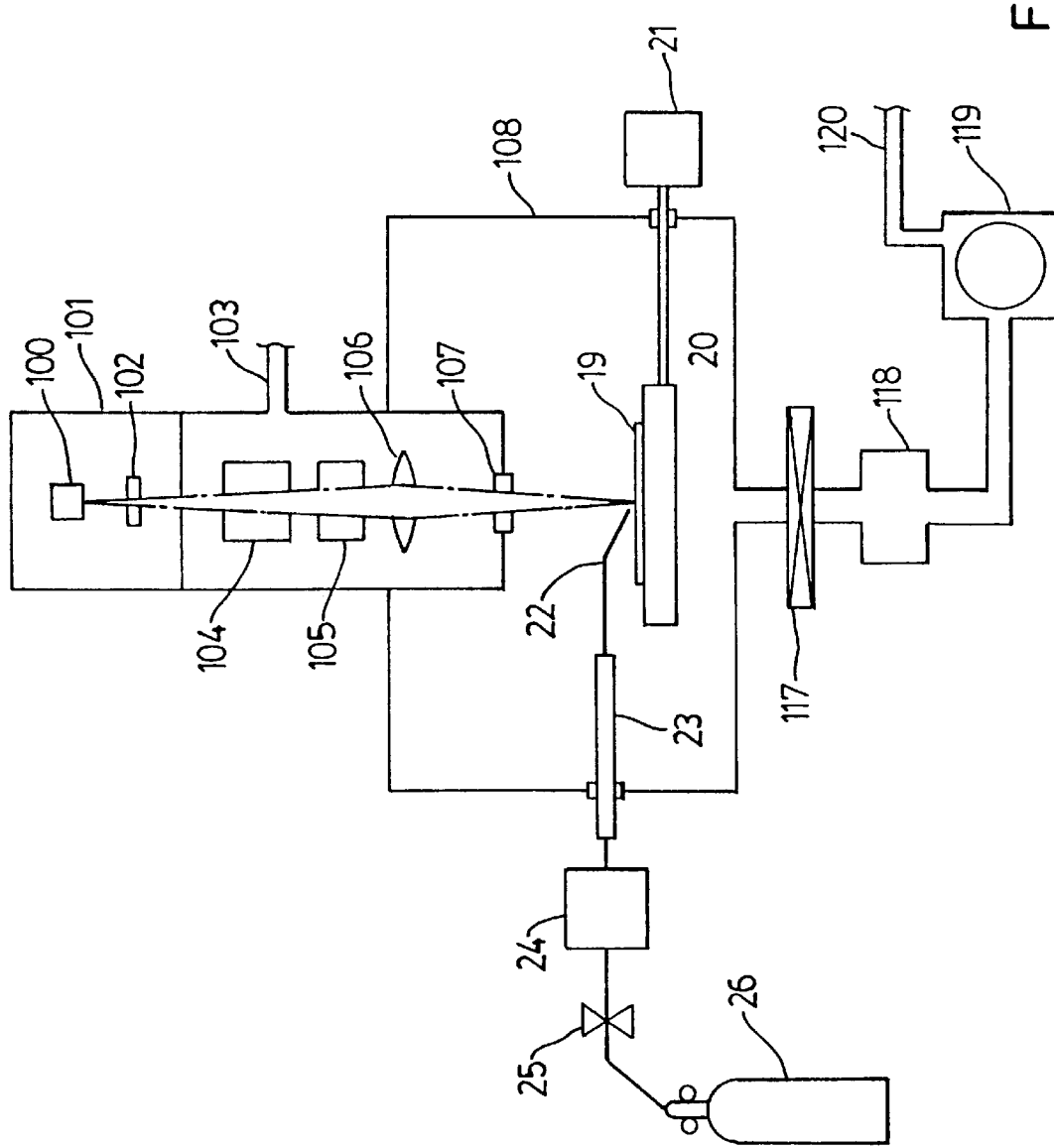
FIG. 2 shows a FOCUS manufacturing and/or editing system based on a typical energy beam technology in accordance with an embodiment of the present invention.

A second embodiment of the present invention, shown in FIG. 2, employs a high powered laser, or other light source, as a focused energy beam. In this case, the laser or other light source (hereinafter referred to collectively as the "light source") delivers the required energy to the three-dimensional part to cause the decomposition of a suitable precursor gas, such as nickel carbonyl or tungsten carbonyl gas.

FIG. 2 shows a source of photons shown as light source 100 which may be a laser, a xenon continuous lamp, a xenon flash lamp or an arc which provides high intensity light of the required wavelength, which may be light in the microwave, infrared, visible or ultraviolet, vacuum ultraviolet or x-ray wavelengths. The light is further filtered, if required, by a filter 102 to remove any unwanted wavelengths. Light source 100, and all the related optical components, may be contained in a housing 101 which allows the introduction of purging gas, such as dry nitrogen, via a purging port 103. As will be apparent to those of skill in the art, purging of the optical components is desired in a variety of circumstances, and in particular to allow the use of deep ultraviolet wavelengths which are in the region which is attenuated by atmospheric air. Housing 101 also serves to prevent dust or stray light from entering the optics and protects personnel from exposure to harmful intensities or wavelengths of light.

The beam of light produced may be scanned onto three-dimensional part 19 in an X-Y fashion by a scanning mechanism 104, which can be a mirror based or prismatic scanner, or any other suitable light or optical scanning system as will occur to those of skill in the art. It is contemplated that such an X-Y scanning mechanism will allow the use of the focused energy beam in a manner similar to a confocal microscope to permit identification and location of the desired area for alteration on a three-dimensional part for editing purposes, as described above, and for verification purposes. Further, this scanning mechanism can be employed to permit ablation or deposition of material over very localized regions so as to permit enhancement and/or touch up of features on a three-dimensional part.

The beam of light is modulated by a modulator 105, if required, which can be any of the standard types of optical modulators. If a flash lamp is employed as light source 100, then modulator 105 is not required as the modulation is provided by a flash controller.

The beam of light is focussed by an objective lens 106 which can be a reflective or refractive optic. Lens 106 can be fabricated from glass, fused silica, sapphire, crystal, plastic, or other optical materials, or mirror surfaces or any combination thereof and can be a simple lens or a compound system of lenses as will be apparent to those skilled in the art. The optical system within housing 101 is sealed from the fabrication chamber 108 by an optical component 107, which can be a precision window or can form part of lens 106. In general, it is preferred to make optical component 107 a replaceable window as it may be damaged by metal deposition over time and need to be replaced. In this case, a thin fused silica or sapphire window, such as a fused silica or sapphire microscope cover glass, can be the desired choice for isolating the optical system from fabrication chamber 108. Sapphire is a good material due to its extended transmission in the infrared region and its good transmission in the rest of the visible and ultraviolet spectrum.

The energy conveyed by the beam of light impinging on the three-dimensional part 19 causes the precursor gas supplied through nozzle 22 to decompose, resulting in deposition of the desired material on three-dimensional part 19 in the form determined by the controlling computer depending on beam size, intensity, wavelength, pulse duration and the flow dynamics of the precursor gas and the environment at the deposition site. Stage 20 and drive 21 can be substantially the same as in the previous embodiment, as can the gas delivery and generation system, 22 through 26.

A main valve 117 seals fabrication chamber 108 from the gas removal and scrubbing system. A gas scrubber 118 removes the toxic or harmful components of the gases leaving fabrication chamber 108 and an exhaust pump 119 pumps the exhaust gases to an external port 120. A load lock, as in the above-described embodiment, may be used to introduce three-dimensional part 19 into fabrication chamber 108.

Typically, the laser employs a wavelength at which an organo-metallic gas, such as nickel carbonyl, is substantially transparent and the three-dimensional part such as the nickel three-dimensional part being written into existence is substantially absorbing and which has a suitably short wavelength to deliver the required deposition resolution. The advantages of this system are that the three-dimensional part can be held at atmospheric pressure or slightly reduced pressure and that the system can quickly deposit the required material under the supervision of the confocal scanning imaging aspect of the system.

The spot size of a laser beam is selected to deliver a beam diameter equal to a size required to give the desired geometrical resolution with a single controlled pulse of the light source. The three-dimensional part, which is typically a nickel three-dimensional part in the case of employing nickel carbonyl as the percursor, as above, is stepped in the direction of motion by the drive system under the stationary focused laser beam by the controlling computer system. Alternately a number of laser system can be stepped or positioned over a larger part and all the laser systems can be used in concert under computer control to write the three-dimensional part while it is held motionless. The laser "on" time is modulated to give the required geometry corresponding to the data stored in the image file for the three dimensional part.

Some typical examples of combinations of compositions of three-dimensional parts and deposited materials that can be produced using these methods follows. Silicon dioxide or silicon monoxide material can be deposited on a fused silica or sapphire three-dimensional part. Nickel, gold, copper, beryllium, platinum or tungsten material can be deposited on a nickel or other metallic, organic or ceramic three-dimensional part. Metallic or ceramic materials can be deposited on a glass or ceramic three-dimensional part. Other combinations will be obvious to those skilled in the arts including metallurgy, inorganic, organic or organometallic chemistry, or ceramics.

Figure 3:
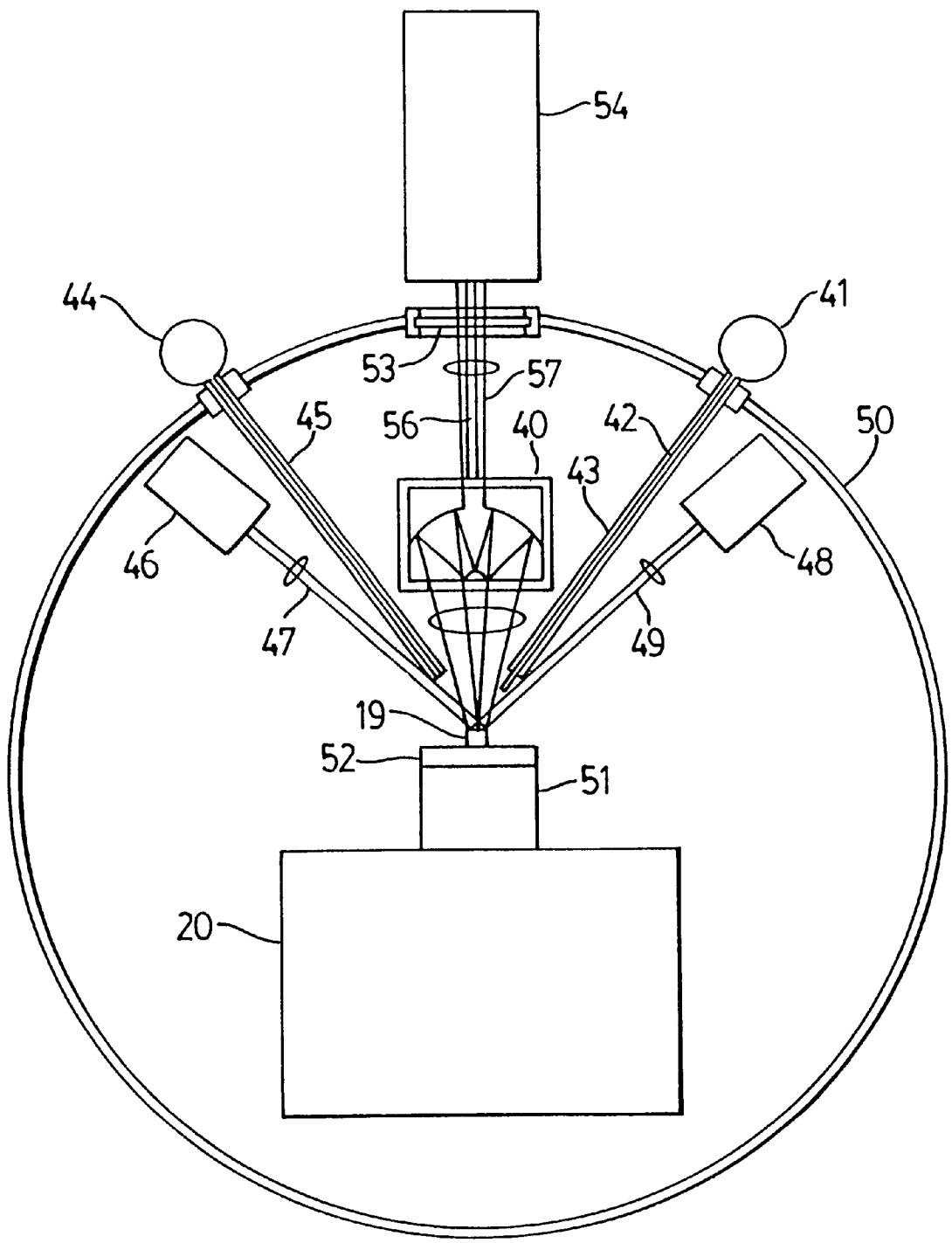
FIG. 3 shows a typical basic FOCUS manufacturing and/or editing system in accordance with an embodiment of the present invention.
Figure 4:
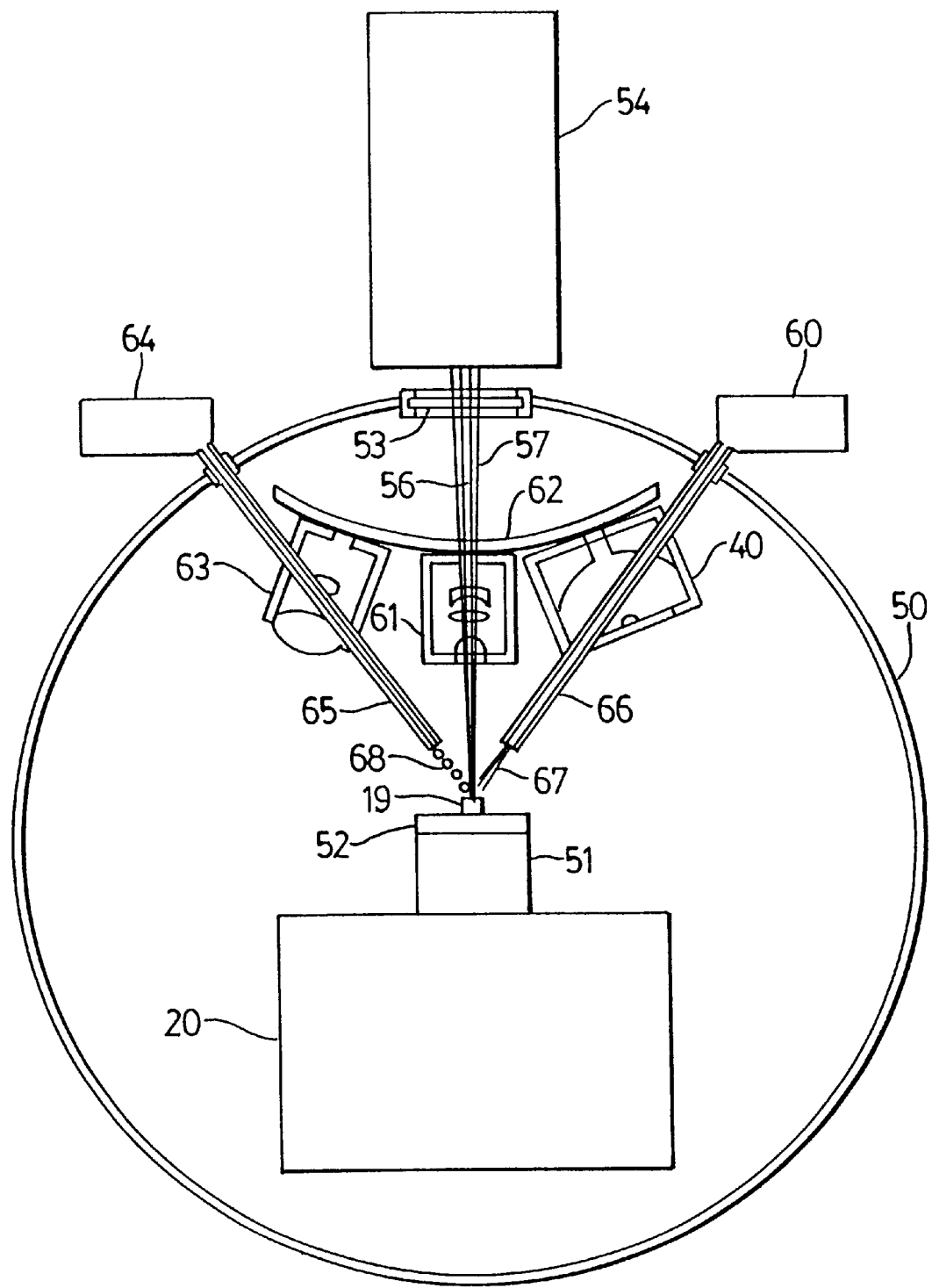
FIG. 4 shows a typical mid-level FOCUS manufacturing and/or editing system in accordance with another embodiment of the present invention.

A third embodiment of the present invention, FOCUS, is shown in FIG. 3. In this embodiment an imaging system based on one of the ARTIMIS designs 54 described later in this application is used to view a deposition or ablation process through a window 53 in a fabrication chamber 50 where the fabrication chamber 50 is designed for atmospheric pressure operation and/or for elevated pressure and/or vacuum operation and/or toxic material containment with or without load lock and viewing ports other than the ARTIMIS ports. Depending on the number of ARTIMIS systems and deposition and ablation processes used to fabricate a given three-dimensional part more than one window can be included in chamber 50 to accommodate the required number of ARTIMIS systems 54. The larger the part being written is, then the more beneficial it is to use multiple deposition and ablation processes to reduce the total write time. A variety of ARTIMIS systems 54 with different spectral and imaging capabilities can be used in a single FOCUS system to view various different deposition and/or ablation processes which can then function in co-ordination to either work on a given three-dimensional part either singly in sequence or simultaneously. Depending on the deposition or ablation process used, the ARTIMIS system 54 can either be used solely for imaging or can be used to supply the energy beam and also be used for imaging. In FIG. 3 the ARTIMIS system is being used to both supply the primary energy beams for deposition control and for ablation. The energy beam is delivered down the beam path 56 which is focused through a optical system 40 which may be a reflective optic or a refractive optic, or a coaxial optic where the energy path passes unimpeded through the core of the optical system while the imaging ray path passes coaxially around the hollow beam path. The optical system 40 may be designed for use in any or all of the x-ray, vacuum ultraviolet, ultraviolet, visible, infrared or microwave regions of the electromagnetic spectrum. The optical system may also be designed to be a macroscopic system for viewing large parts, a microscopic system for viewing small parts or for viewing small areas of large parts or a zoom optical system with a wide range of focal lengths for flexibility in choosing the size of the region being imaged. In FIG. 4 an optical system is shown consisting of a variety of optical elements such as a reflective objective 40 and a medium power refractive objective 61 and a low power wide field objective 63 that are brought into the beam path or paths by a variety of means including a revolving nose piece or a track of circular section 62. The reason for employing multiple selectable objectives for the optical system can be either to achieve different fields of view or to achieve different spectral regions. The imaging ray path 57 includes and surrounds the energy delivery beam path 56. The optical system 40 may be either internal or external to the fabrication chamber 50. Alternatively the ARTMIS system or systems 54 can incorporate the focusing system 40 and the resulting unit can be internal or external to the fabrication chamber 50. Where the beam paths pass through the window 53 in the chamber 50 a guard (not shown) can be included to protect the beam path from interference from the atmosphere, vapors or particles in the fabrication chamber.

The ARTIMIS system 54 is used to image the three-dimensional part in order to determine its current status. The ARTIMIS system 54 is also used in this case to apply energy to the three-dimensional part in order to aid the deposition process. In FIG. 3 there are two depositions employed. The processes chosen are a welding process based on the MIG or TIG welding methods and a gas deposition process based on the decomposition of an organometallic, metal halide, or other suitable gas. The welding wire form material 42 is supplied adjacent to the part by supply tube 43 from magazine 41. The magazine 41 can be designed to sequentially supply one of a variety of materials from different spools under control of the supervising computer system. In the case of an electric welding process such as shown here the electric current passes down the wire 42 or via the supply system 43 and the current returns via the conductive base 52 on which the part 19 is mounted. Alternately local contacts (not shown) can be brought to bear against conductive regions of the three-dimensional part in order to establish a conduction path if the mounting surface of the three-dimensional part is not conductive. Alternately the energy beam 56 can supply all the energy for the welding process in cases where the welding material 42 is a thermoplastic material or where the use of electric currents is disadvantageous. As the weld material is laid down ARTIMIS 54 is used to confirm that the characteristics of the deposition meet the design image in the controlling computer data file.

ARTIMIS 54 can be used to monitor as many parameters as are required to ensure the part conforms. In simple parts with only one material then ARTIMIS 54 can be used to provide two dimensional image data only. In more complex parts ARTIMIS 54 can be used to provide three dimensional image data at several wavelengths. In complex depositions ARTIMIS 54 can be used to provide thermal image information to guarantee local or widespread heating or cooling, and confirm heating and cooling rates and to hold various parts of the three-dimensional part to various desired temperatures using auxiliary heating and cooling sources. In very complex processes ARTIMIS 54 can be used to provide any or all of the above and also to provide spectral data on the deposited or ablated material in order to determine and/or monitor the chemical composition of the part as it is being written. In this way subtle gradients or rapid shifts in material composition can be created by controlling the supply of deposition material and the local environment, particularly the three-dimensional part temperature. Using this aspect of the invention ARTIMIS 54 can monitor and control such processes as oxide formation, nitriding, alloying, glass compositions and other treatments.

Figure 5:
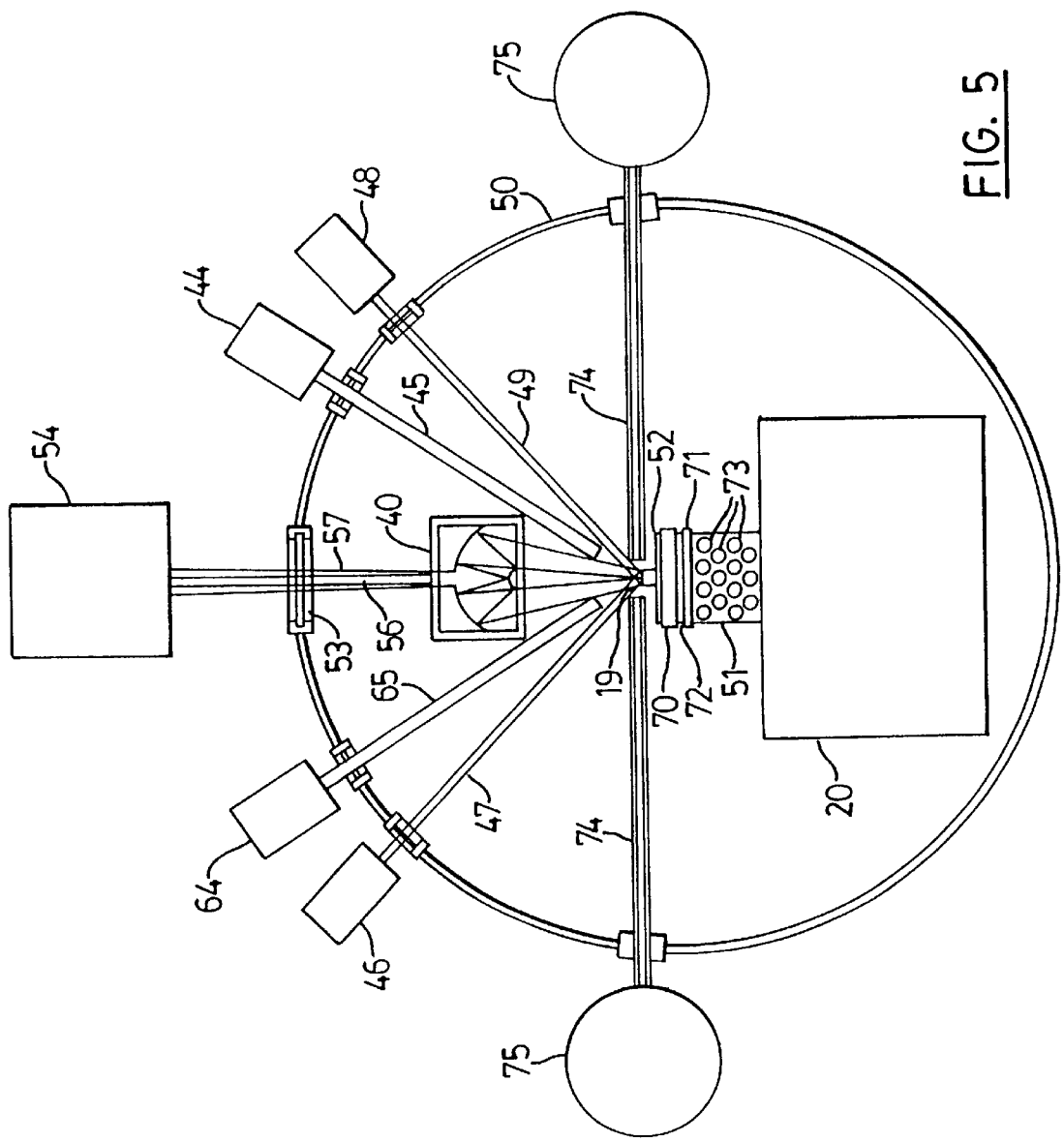
FIG. 5 shows a detail of a typical active work area of the FOCUS system in accordance with another embodiment of the present invention.

In FIG. 3 the three-dimensional part 19 is mounted onto a base 52 which may be thermally and/or electrically and/or magnetically and/or acoustically insulating or conducting. The base 52 may also be a permanent magnet with poling to suit the needs of the part being written. The base 52 is mounted onto a support block 51 which is mounted on the movable stage 20. The support block 51 may include thermal control means including such typical means as thermo-electric devices, fluid cooling systems, gas cooling systems or vortex devices. FIG. 5 shows the block 51 with thermal transfer fluid passages 73. In FIG. 3 and in all subsequent figures the drive 21 for the stage 20 is integral to the stage 20 and not otherwise shown. The base 52 and block 51 may be omitted depending on the requirements of the deposition process.

Also in FIG. 3 is included a source of precursor gas 44 which can be any precursor gas depending on the deposition process being employed to write the part. The precursor gas is supplied adjacent to the three-dimensional part by delivery tube 45. The precursor gas may be applied simultaneously with other deposition processes or sequentially.

In FIG. 3 a secondary energy source 48 which can be any energy beam 49 source is used to provide local preheat or assist in the deposition or ablation process. A secondary light source 46 is used to illuminate the three-dimensional part with energy beam 47 to provide illumination for the imaging operation of ARTIMIS system 54. Source 46 can be an broadband or narrow band or spectral line source in any of the infrared, visible, ultraviolet or x-ray regions.

In FIG. 4 another embodiment of the FOCUS system is shown. A precursor gas 67 is delivered adjacent to the three-dimensional part by supply tube or tubes 66 from the precursor gas source 60. A second source of material 68 in particulate or powder form is supplied adjacent to the three-dimensional part by supply tube or tubes 68 from material source 64. The energy beam 56 is used to cause the deposition of the desired material on the three-dimensional part from the precursor gas. The energy beam is also used to cause the material 68 to melt and fuse with the three-dimensional part or alternately the powder may be only entrained, entrapped or encapsulated by the decomposing precursor gas. Alternately two sources of material 68 may be used where one melts and fuses at a lower temperature than the second material in which case solid particles of the second material will be incorporated in the molten first material as the energy beam 56 melts and fuses the material in place. The ARTIMIS system 54 allows precise control of the geometry and temperatures of this type of complex fusion process so that material with very similar but slightly different melting temperatures can be successfully employed.

In FIG. 5 a single acoustic source consisting in this example of a piezoelectric element 70, mounted between the conductive base 52, which serves as the upper electrical contact for element 70, and lower contact 72, is used to generate an acoustic field which is conveyed to the three-dimensional part mounted on base 52. Auxiliary gas sources 75 supply gas under control of the supervisory computer adjacent to the three-dimensional part by way of tubes 74. The auxiliary gas may be used for local heating, local cooling, surface treatments such as nitriding or case hardening, or as a reactant gas in an ablation or chemical etching process.

A central feature of many of the embodiments of the present invention is the ARTIMIS imaging and spectral system. The purpose of the ARTIMIS system in all its embodiments is to provide feedback information to a supervising computer so that any of a number of manufacturing parameters involved in writing, editing or ablating a three-dimensional part can be as precisely controlled as desired. The precision of the part production or editing process is then defined by the resolution and the number of parameters of information provided by ARTIMUS and the number of degrees of control of the part production process system, FOCUS. The FOCUS system places the final control of the three-dimensional part process with the computer so that multistep processes requiring precise monitoring and control sometimes over long periods of time can be accomplished without substantial operator intervention, with the manufacturing control coming from information supplied by the ARTIMUS system, and without the three-dimensional part having to be moved from system to system for successive manufacturing steps. The ARTIMIS system supplies the feedback information which is the key to achieving finished parts with the FOCUS system. Typically parts produced by the focus system will need no final post processing before use.

The typical basic embodiment of the ARTIMIS system employs a single image acquisition system which supplies image data to a computer. The image system supplies ultraviolet or visible image data on the object being viewed to the computer via an image capture system. The reason for choosing ultraviolet or visible light is that such light is beyond the temperature range of the deposition or ablation process that is chosen for use in the FOCUS system, and consequently the radiation from the FOCUS process does not flood the image with glare from the surrounding material. The source of illumination are one or more visible or ultraviolet light source such as a laser of suitable wavelength, xenon arc, deuterium arc, mercury arc, fluorescent lamp, arc discharge tube, light emitting diode or diodes, or incandescent source. The light is introduced into the beam path of the imaging system by any of the known methods for imaging or microscopy with reflected light. Alternately the illumination for the first imaging system may be obtained from the object being viewed if the object is hot enough for radiation from the object to fall in the range of wavelengths employed by the first imaging system. A set of filters is inserted individually or in concert into the beam path between the imaging system and the object under computer control in order to remove any wavelengths of light from the FOCUS energy beam, where the energy beam is a laser or other monochromatic or spectral line source, and to isolate specific desired spectral regions which can be used to convey spectral information which contains temperature and/or chemical information about the object. The objective lens for the imaging system may be chosen from one of many to provide magnifications that are appropriate to the field of view required to control the FOCUS process. For mass deposition a low magnification lens would be selected while for precise structures, miniature or micro-parts or fine surface finishes and details a higher power lens would be selected.

Figure 6:
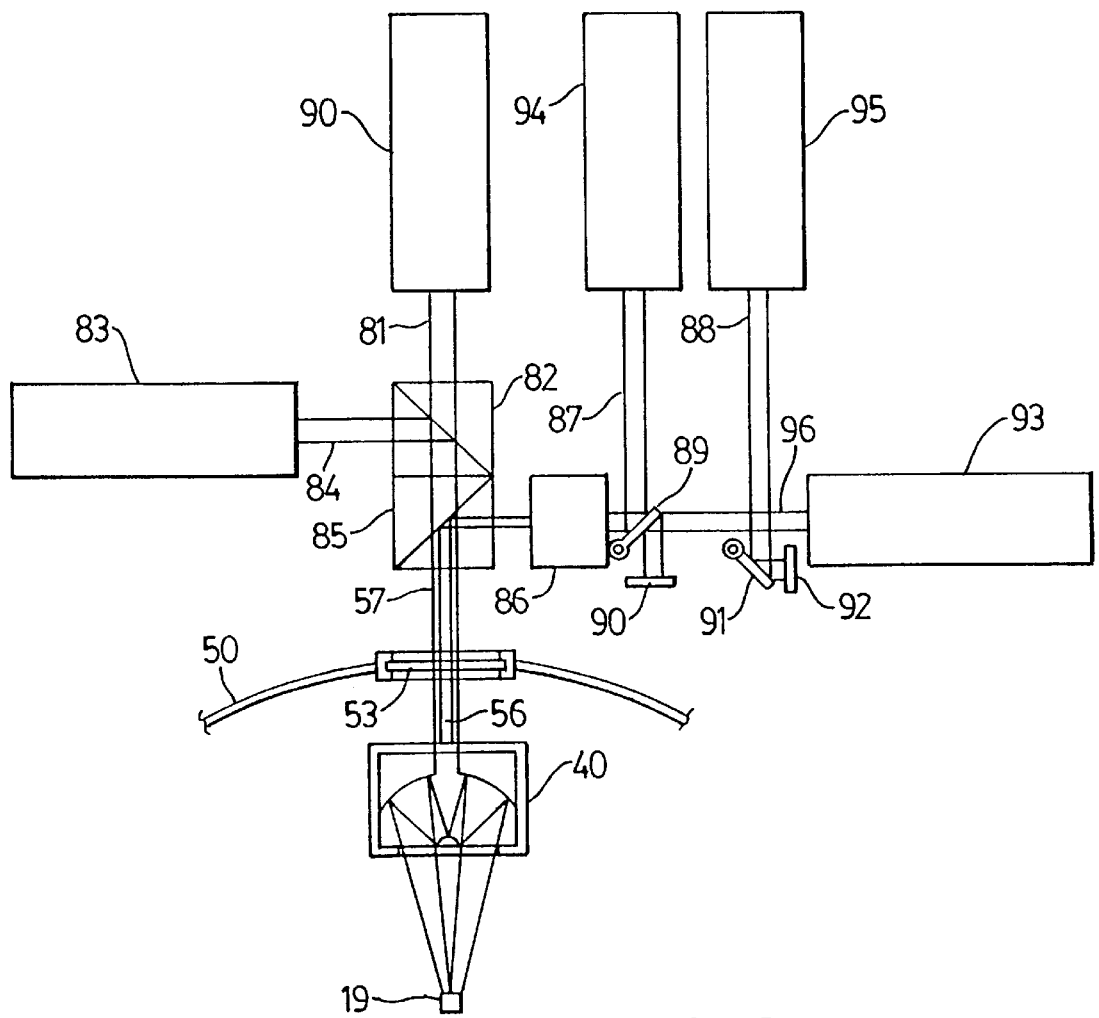
FIG. 6 shows a detail of a typical photonic monitoring and energy delivery system for the FOCUS system in accordance with another embodiment of the present invention.

A typical embodiment of a more complex ARTIMUS system is shown in FIG. 6. Visible and/or ultraviolet imaging system 83 acquires image data of the three-dimensional part via image ray paths 84 and 57, beam combiner 85 and beam splitter 82, and objective lens 40. Imaging system 83 may incorporate selectable filters or a monochromator means under computer control in order to switch and limit the wavelengths of light used for image creation. A typical reason for such an arrangement would be to select a deep ultraviolet filter to protect imaging system 83 from glare due to high temperatures of the three-dimensional part and then remove the filter for full spectral viewing when the three-dimensional part was at a lower temperature and glare was not a concern. Another typical reason is to create pseudo color images of the part where the traditional red, green and blue aspects of the final image correspond to selected spectral regions which are chosen by the computer via the filters and/or monochromator means. Pseudo colour images can be employed to show one material as a specific color while second and third materials are shown as corresponding second and third colors based on their (typically reflective) spectral characteristics. Since many metals exhibit differential spectral absorption and reflection in the infrared, visible, ultraviolet and vacuum ultraviolet then these spectral regions can be used to rapidly differentiate between different metals or compositions. The beam splitter 82 routes the infrared, visible and ultraviolet wavelengths of interest to imaging system 83 while other wavelengths pass on to spectral and/or thermal analysis system 80.

The spectral and/or thermal analysis and/or imaging system 80 can consist of a monochromator means with a photon detector such as a photomultiplier tube or a photodiode or other suitable single point or array type detectors of suitable wavelength sensitivity; and/or it can consist of a thermal and/or infrared imager array with or without filters or monochromator means. There are many available choices of imaging devices which can be chosen for the ARTIMUS sensor as detailed in the ARTM patent application and as will be apparent to those skilled in the art. This analyser or imager is used to primarily provide feedback on the three-dimensional part in terms of dimensional, temperature and chemical composition.

The beam splitter 82 can be a prism beam splitter as shown or it can be a dichroic mirror or an ionically or colloidally colored glass or other material. Such beam splitters are well known to those skilled in the art. Similarly beam combiner 85 may be accomplished in a variety of ways which are well known to those skilled in the art. Beam combiner 85 is used to combine one or more energy beams 86 with the imaging beam 57 for applications in which the deposition process requires an energy beam that is on axis to the imaging system. Off axis systems where the imaging beam 57 and energy beam 56 arrive at the three-dimensional part at slightly different angles can also be employed.

A controllable beam expander/condenser such as a zoom optical system, and/or aperture 86 is used to set the spot size of the energy beam or illuminating beam at the three-dimensional part. The controllable expander/condenser and/or aperture is controlled by the supervisory computer. Depending on the application the beam expander 86 may be omitted.

An energy source 94 such as an excimer laser is used to supply an energy beam 87 for ablation. Many different types of energy sources 94 can be employed depending on the material being written, edited or ablated at the three-dimensional part. The beam 87 is directed to the beam expander 86 by the tiltable mirror 89, and similarly 91, which may be a tilting or rotating chopper style mirror all under control of the supervising computer. When the mirror 89 is not directing the beam to the expander the beam is incident on a cooled absorbing safety target 90 so that the beam 87 does not reflect back into the laser or into another part of the system where it might do damage. By tilting the mirror in and out of the beam path the system can switched to and from ablation mode. If the energy source 94 is a pulsed source then it may not be necessary to include target 90.

A second energy source 93 provides thermal or infrared energy to the beam expander 86. The energy source 93 is typically a carbon dioxide laser. The reason for the direct beam path from the energy source 93 to the beam expander is to allow the highest possible efficiency in the delivery of this energy beam to the three-dimensional part. The energy source 93 can be chosen on the basis of selecting wavelengths where the three-dimensional part is substantially absorbing in order to ensure the greatest energy transfer and smallest reflections from the three-dimensional part.

A third energy source 95 which can be a tunable light source, a non-tunable monochromatic light source, a plurality of selectable light sources or a monochromatic or polychromatic laser, provides an energy beam 88 which is directed to the beam combiner 86 via tiltable mirror 91. The safety target 92 is supplied for the same reasons as target 90. The purpose of the tunable source is to provide the bandwidth limited light for spectral scanning to determine chemical compositions of the three-dimensional part.

Figure 7:
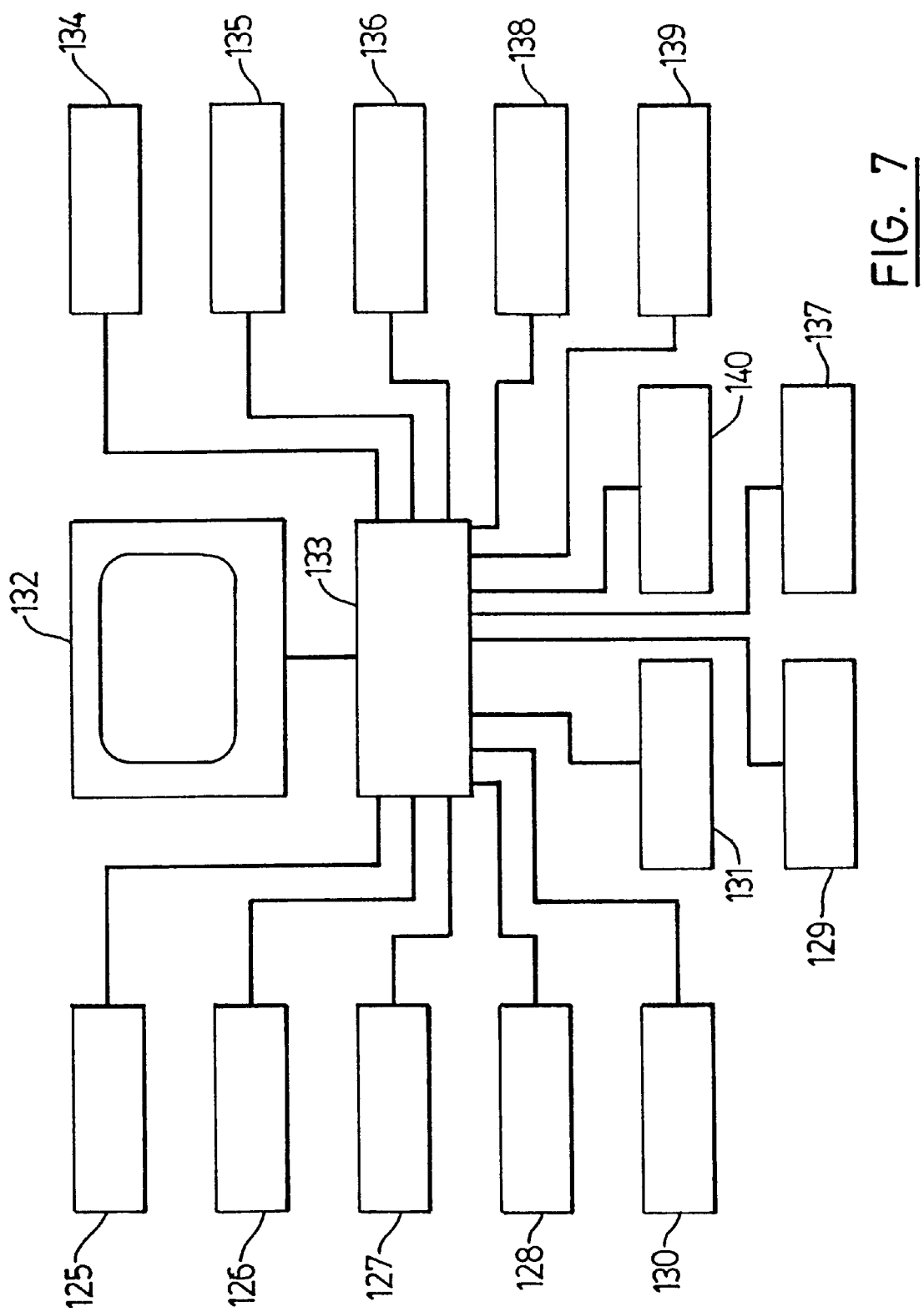
FIG. 7 shows a typical computer supervisory and control system.

FIG. 7 shows a typical supervisory computer system 133 with its monitor 132, which can be used either as a single monitor to show sequentially control information and image data, or can be a multiple array of monitors to simultaneously display the image data and the control information. The control system 125 is the ultraviolet, infrared and/or visible imager, which transmits image data and receives gain, filter, exposure and other control data. The control system 126 is the infrared and/or thermal and/or spectral imager and/or analyzer which transmit image and/or spectral data and receives control information for filters, wavelength and bandwidth selection, detector selection and aperture size. The control system 127 controls the tunable illumination source. The control system 128 controls any or all of the weld arc frequency, pulse rate, current, voltage, feed rate, material selection or shielding gas flow and composition. The control system 129 controls excimer laser for intensity, pulse rate, pulse duration and beam selection. The control system 130 controls main energy beam such as the infrared laser for any or all of power, continuous or pulsed mode, pulse frequency, pulse duration, and beam selection. The control system 131 controls the atmosphere control system including any or all of pressure or vacuum pumps and valves, atmospheric gas composition, gas analysis (which may also or alternately be provided by the spectral analysis capabilities of the ARTIMIS system) and the gas scrubbing, recycling and exhaust system. The control system 135 controls the electric field system for any or all of X,Y and Z vectors and for rotation and tilt. The control system 136 controls the acoustic field system for any or all of power, frequency, waveform and vector directions in one or more planes.

The control system 137 controls the stage movement for at least one axis of movement. Typically a three or five axis controller would be used and controlled by 137. The control system 138 controls thermal source/sink in the mounting block 51. The mounting block can be controlled for any of heat rate, or cooling rate, or the control 138 can be used to control gas cooling systems. The control system 139 controls any or all of the selection, generation, preheat, temperature, cooling, ionization, mixing, charge or delivery dynamics of precursor gas or gases to the three-dimensional part. The control system 140 controls the supply of any or all of powders, particulates, component parts, vapors or liquids to the three-dimensional part.

It is the integration of the control functions described above with the feedback provided by ARTIMIS that make FOCUS possible.

Figure 8:
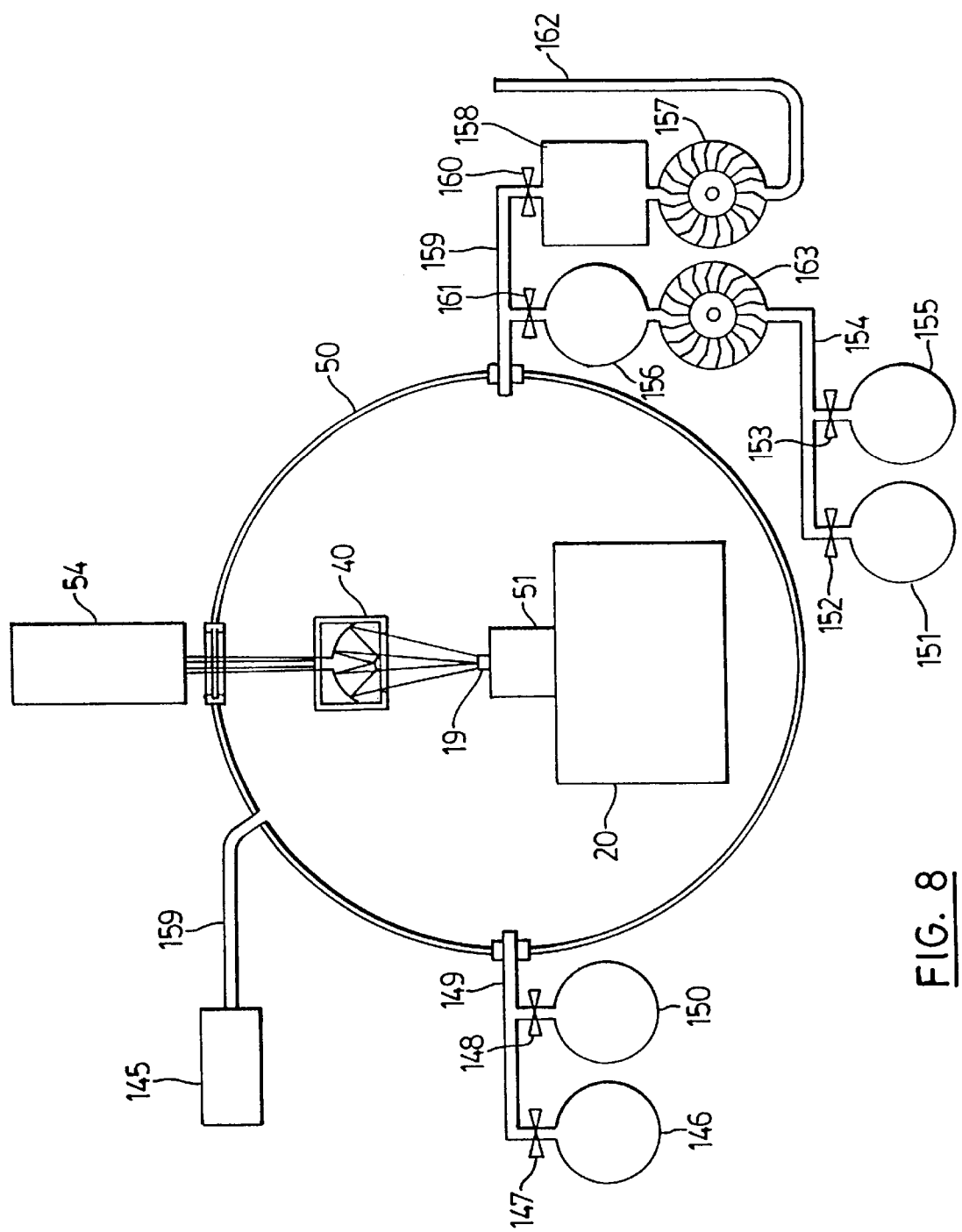
FIG. 8 shows a detail of a typical environmental control system for use with the FOCUS system in accordance with the present invention.

In FIG. 8 a typical FOCUS atmosphere control system is illustrated. Gas analyser 145 monitors the composition of the internal environment of the fabrication chamber 50 via tube 159. First gas supply 146 provides gases such as reactants, inert gases, or precursor gases to the fabrication chamber 50 via valve 147 and manifold 149. A second gas source 150 can be supplied to the chamber 50 via valve 148. Third and fourth gas sources 151 and 155 are supplied to pressure pump 154 via valves 152 and 154 respectively. Pressure pump 154 charges reservoir 156 with pressurized mixed or single component gas which is released into chamber 50 via valve 161 and manifold 159. Also connected to manifold 158 is a vacuum system 157 with a scrubber/recycler and/or toxic gas removal system 158 which may include a vacuum reservoir for rapid exhaustion of the chamber 50. The gases leaving the vacuum system 157 are directed to a safe exhaust point by ventilation duct 162. Any or all of the atmosphere control components shown in FIG. 8 may be omitted or selected for use in focus system depending on the deposition, editing and/or ablation methods that are chosen for the three-dimensional part.

Figure 9:
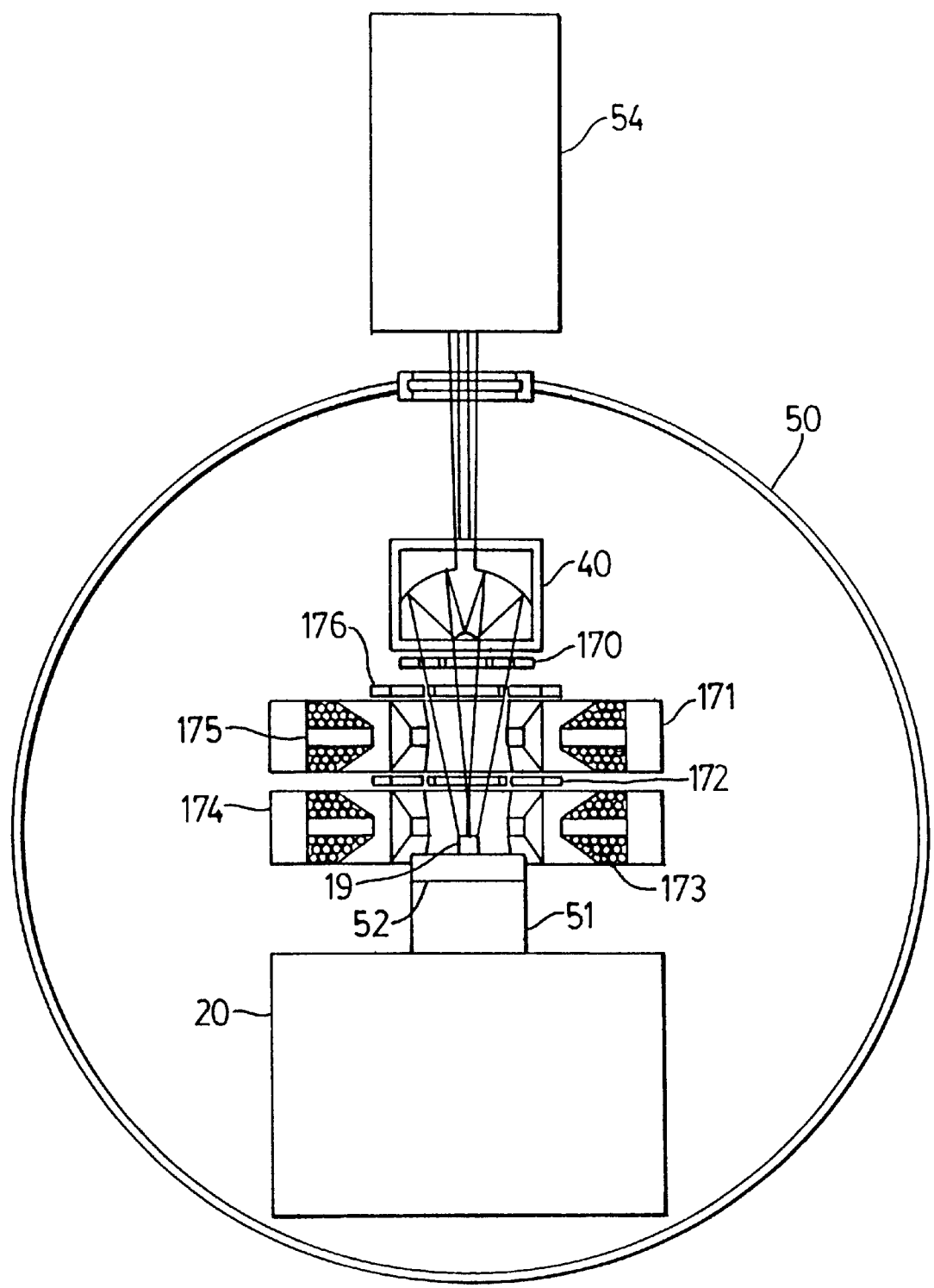
FIG. 9 shows a plan and cross-section of a typical electrical and magnetic field manipulation and control system for the FOCUS system.

FIG. 9 shows a typical arrangement of an electric and magnetic field control system for a FOCUS system. Any or all of these field control components may be used to control the electrical and magnetic (EM) fields in a FOCUS system. Alternately some applications may not require EM field control and all of these components may be omitted. The electric field control system consists of first field ring 176 where this field ring and all other following rings may either be a single ring structure or it may be a system of several, typically six, segmented independently supplied and insulated rings. A second and third ring similar to the first ring are shown as 176 and 172 in FIG. 14. The base 52 can serve as the ground or reference plane for the electrical field adjacent to the three-dimensional part or the entire three-dimensional part can be allowed to "float" by electrically insulating it from the base 52 and block 51. The reason to employ the six segment design is to accomplish rotating electrical fields. The field geometry and motion can be controlled by controlling the voltage, frequency, waveform and switching of the applied voltages to various ring segments.

Where the material being deposited has characteristics that allow the principles of electrostatic attraction or repulsion to be employed to benefit then the deposition material can be charged or the part being deposited on can be charged, or both, with electrical charges of appropriate intensity and polarity to assist in the deposition process. Alternately, electrostatic attraction and repulsion can be used with the FOCUS system and ARTIMUS to selectively direct streams of particles such as a medium temperature plastic to or away from a hot work piece so that deposition of the plastic on the work piece occurred immediately upon the plastic impinging on the workpiece when the electrostatic field caused its path to strike the workpiece while at other times changes in the electrostatic field would cause the plastic to bypass the workpiece and be recycled for later redirection past the workpiece. In this way control of the modulation of the electrostatic control under the controlled feedback of ARTIMUS would allow very precise parts to be built up quickly from any material or combination of electrostatically and thermally compatable substances.

The magnetic field is controlled by a series of magnetic stators shown as 171 and 174 in FIG. 9. In this drawing two stators are used but one or more could be used depending on the application. The stators hold pole pieces 175 about which are wrapped coils 173 to energize the poles. By selectively energizing poles with controlled frequencies, currents, waveforms, and switching between stators, various field vectors, rotations, tilts and profiles can be established.

Figure 10:
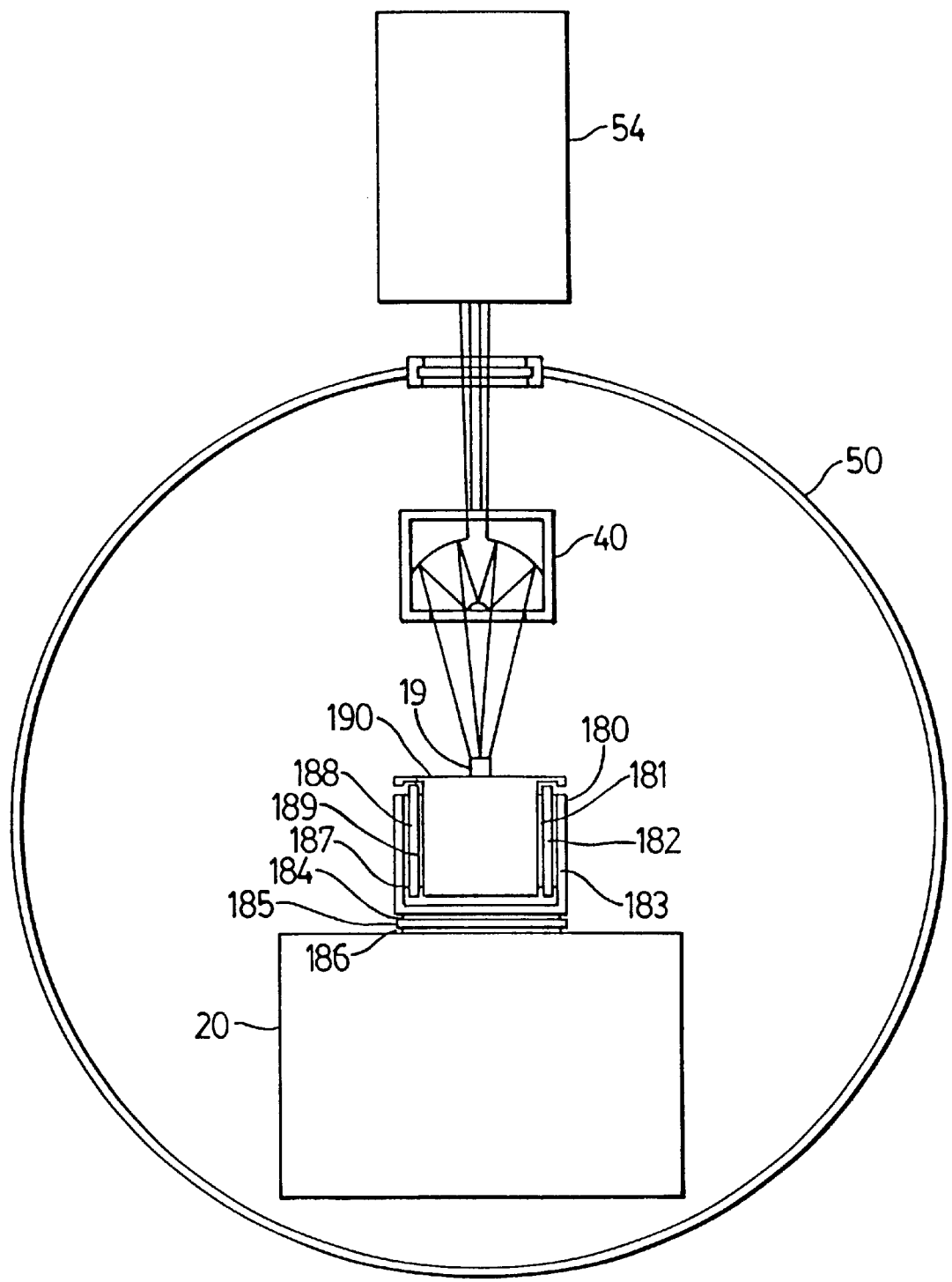
FIG. 10 shows a typical plan of an acoustic field manipulation and control system for the focus system.

FIG. 10 shows an acoustical control system for the FOCUS system. Depending on the materials used and the final outcome desired it can be advantageous to control the acoustical field during deposition. A simple application is to cancel any room vibrations or equipment vibrations during deposition to achieve a mirror finish during a fire polishing step. This is accomplished by applying a vibration equal in intensity and opposite in phase to the ambient vibration thus cancelling the ambient vibration and holding the three-dimensional part stationary. In FIG. 10 a piezoelectric acoustic field generator is shown, alternately electromagnetic, fluid dynamic or other acoustic sources can be employed. In FIG. 10 the part 19 is mounted on block 190 which forms the inertial limiting, high frequency filter to the acoustic transfer system between the acoustic source and the part 19. For high frequency operation the block 190 must be of small mass or the power requirement to create the field will be high. Two acoustic sources consisting of inner conductors 181 and 188, peizoelectric elements 182 and 189, and outer conductors 183 and 187 are mounted in yoke 180 and driven so that they receive equal amplitude but opposite phase signals. A third acoustic source consists of inner conductor 184, outer conductor 186 and peizoelectric element 185. The first and second acoustic sources produce X and Y axis movements while the third acoustic source provides Z axis movement. Either single, dual or triple axis acoustic sources can be employed depending on the field that is desired. An array of acoustic sources can also be used for beam shaping and/or creating rotating or tilting acoustic fields. These fields can then be used to create patterns in, and convey localized energy to, the three-dimensional part.

The following is a typical example of FOCUS being used to write a multilayer metal laminate. In this example steel and nickel are layered by the use of a FOCUS system with an electric arc welding deposition process and a nickel carbonyl deposition process. First a starting substrate of a suitable base metal such as steel plate is mounted as the three-dimensional part on base 52. Then a complex shape in steel is written by welding deposition of steel in the desired pattern on the three-dimensional part under the control of ARTIMIS 54. After the desired structure is written then the energy beam is used to reheat, and if necessary, surface polish by fire polishing, and anneal the steel layer. Then in order to introduce a nickel layer the precursor gas source is used to supply nickel carbonyl which is decomposed locally by the energy beam and deposited as elemental nickel on the three-dimensional part. After this step the welding system can be used to cover the nickel layer with a new layer of steel or other weld material. Post anneals, post tempers and local insertions of material are made possible by ARTIMIS 54 monitoring the deposition parameters while the energy beam performs the desired operation. ARTIMIS is used as necessary to monitor the steps of the layering process including the geometry, structure, temperatures and chemical compositions or surface chemistries of the three-dimensional part. Where a large dimensional part is to be incorporated into the finished part built using the FOCUS system such large part can be premanufactured and delivered to the correct location by a robotic or other type of part delivery system which can also serve to correctly locate and position the part to be incorporated until such time at the FOCUS system has built up suitable material to lock the part to be incorporated into position.

The following is another typical example of FOCUS being used to build a complex part with a precursor gas and a number of powder depositions under the control of the ARTIMIS system. A metallic gold base is mounted unto base 52 which is mounted on cooling block 51. An suitable inert or reducing gas atmosphere is introduced into the fabrication chamber 50. A gold precursor gas is written onto the surface of the gold three-dimensional part in the form of a cloisonne structure according to an image file in the controlling computer while ARTIMIS is used to provide the geometrical and structural feedback to make the part perfectly. Once the gold is sufficiently cooled by the removal of heat from the resulting three-dimensional part by the block 51 then the three-dimensional part is held at the required fusion temperature for the next step by application of energy from the energy beam 56 under the monitoring of ARTIMIS and the supervising computer. Once the correct temperature is confirmed then a base glass flux layer is applied as a powder by locally scanning the fusion temperature around the internal surfaces of the cloisonne structure using the energy beam. Then again by local heating under the guidance of ARTIMIS successive layers of various glass compositions, colors and characteristics are deposited in local areas to fill the cloisonne structures. As the deposition proceeds the precursor gas system can be used to deliver any size of local inclusions of metallic, or ceramic material to create reflective or absorptive regions. An overcoat of lower temperature high strength glass flux is then deposited over all the glass regions while ARTIMIS ensures that the flux does not contact the metallic cloisonne top surfaces. The energy beam can be used to perform a final fire polish step in which only the very top surface layer of the low temperature flux is reheated to flow into a smooth glassy surface during which the acoustic wave generator can be used to level the surface of the glass. Once all the regions of the cloisonne are filled then the energy beam and ARTIMIS can be used to post anneal the whole structure under careful anneal timing to substantially stress relieve the glass/metal composite. This is only one application area of the complex glass chemistry and glass metal composites that FOCUS and ARTIMIS make possible. Other application area include medical prosthetics, dental implants and miniature electrical components. Another area of application of the FOCUS system is to connect two FOCUS systems via a data link to "transmit" a physical part from one location to another. The first FOCUS system is used to ablate the three-dimensional part while the ARTIMIS system collects data on the three-dimensional part as it is ablated and provides the data to the supervisory computer. The supervisory computer then transmits the data via the data link to the supervisory computer of the second FOCUS system. The second FOCUS system in turn uses the data to write the three-dimensional part into existence at the second remote location. Alternately where a sufficiently complete data file exists for an object then just the data file can be transmitted to the remote location allowing the three-dimensional part to be written from component materials at the remote location thus saving the transportation of the finished part from the data creation site to the location of final use.

Another typical application of a FOCUS system is to transmit the three-dimensional part to an orbiting space station. In this application a set of standard materials say for instance, silicon, aluminum and nickel are sent to the space station along with a FOCUS system. Instead of stocking repair parts a part could then be made to order from the basic silicon, aluminum and nickel using the energy from the solar panels of the station and the carbon compounds from the internal carbon processing systems. This would allow emergency parts or parts made to suit a new application to be made on site without the need to transport them with the attendant delays in transport. The data files for the parts could be made on earth and relayed to station so that designers on earth had complete flexibility in terms of final shape. The FOCUS system could further be integrated as part of a total waste control system where waste streams that could not be otherwise handled would be incorporated into structural components either in sealed voids or as an integral component of the final three-dimensional part. Similarly FOCUS could provide an important way to replace and recycle broken or worn out parts with either no, or a minimum of new material, on a long mission. Since the carbonylation process and such similar gas based organometallic or metal halide extraction processes can effectively be used to return a metal to a precursor gas the FOCUS process can use old or unnecessary parts as the "feedstock" for new or critical replacement parts.

I claim:

1. A method for recycling material, wherein an article is progressively disassembled by an ablation process while a first imaging system monitors the ablation process to determine compositional and dimensional information defining the article; material generated by the ablation process is collected, a deposition process deposits the collected material to form a second article, the deposition of collected material being monitored by a second imaging system, information derived from the monitoring being provided to a computer control system in a feedback loop to permit the control system to continuously supervise and control the deposition process, wherein the second imaging system is a multi-dimensional imaging system and wherein the information derived from the monitoring system includes spatial dimensional information relating to the shape of the deposited material.

2. A method according to claim 1, wherein the deposition process encapsulates waste product to render the waste safe to handle, and/or wherein the waste product changes a physical property of the second article.

3. A method of manufacturing an article, comprising the steps of progressively erasing a first article; collecting the material obtained from the erasing step and performing a deposition process to deposit said collected material and form a second article; monitoring the deposition of the collected material by an imaging system, information derived from said monitoring step being provided to a computer control system in a feedback loop to permit the control system to continuously supervise and control the deposition process.

4. A method for manufacturing an article according to claim 3 in which the process of progressively erasing a first article is monitored by an imaging system which provides information collected during the erasing process to the control system.

5. A method for manufacturing an article according to claim 4 in which the information collected about the first article includes dimensional spatial information.

6. A method for manufacturing an article according to claim 4 in which the information collected about the first article includes chemical compositional information.

7. A method for manufacturing an article according to claim 3 where the deposition process includes at least two different technologies operating in the same deposition chamber.

8. A method for manufacturing an article according to claim 3 where the new article created with the deposition process or processes is equal to the original form of the first article.

9. A method for manufacturing an article according to claim 3 where the new article created with the deposition process or processes is equal to the original form of the first article and where data on the original article is used to create the replica of the original article and new material is added during the deposition process to create the new article.

10. A method according to claim 3 where one or more material is selectively ablated or isolated from an article prior to the deposition process so that the selected one or more materials can be used as a source of material for the article created by the deposition process or processes while other materials are left behind during the ablation process.

11. A method according to claim 3 in which several deposition methods are used sequentially or simultaneously to produce compositionally complex articles containing more than one different material deposited under more than one different deposition conditions.

12. A method according to claim 3 in which the imaging system operates in the infrared and visible portions of the electromagnetic spectrum.

13. A method according to claim 3 in which the imaging system operates in at least one of the infrared, visible and ultraviolet portions of the electromagnetic spectrum.

* * * * *